US005649217A

United States Patent [19]
Yamanaka et al.

[11] Patent Number: 5,649,217
[45] Date of Patent: Jul. 15, 1997

[54] SWITCHING SYSTEM HAVING CONTROL CIRCUIT AND PLURAL BUFFER MEMORIES FOR DATA EXCHANGE IN ASYNCHRONOUS TRANSFER MODE

[75] Inventors: Hideaki Yamanaka; Kazuyoshi Oshima; Setsuko Miura, all of Kanagawa-ken, Japan

[73] Assignee: Mitsubishi Denki Kabushiki Kaisha, Tokyo, Japan

[21] Appl. No.: 116,215

[22] Filed: Sep. 2, 1993

Related U.S. Application Data

[63] Continuation of Ser. No. 601,992, Oct. 23, 1990, abandoned.

[30] Foreign Application Priority Data

| Oct. 23, 1989 | [JP] | Japan | 1-275645 |
| Mar. 2, 1990 | [JP] | Japan | 2-51120 |
| Jul. 6, 1990 | [JP] | Japan | 2-178993 |

[51] Int. Cl.$^6$ ............................ G06F 3/00; H01J 3/00
[52] U.S. Cl. ........................ 395/872; 395/880; 395/849
[58] Field of Search ............................ 364/200, 900; 370/94.1, 60, 60.1, 85.2, 91; 395/425, 872, 849, 880

[56] References Cited

U.S. PATENT DOCUMENTS

| 4,692,894 | 9/1987 | Bemis | 395/250 |
| 4,849,968 | 7/1989 | Turner | 370/60 |
| 4,851,991 | 7/1989 | Rubinfeld et al. | 395/250 |
| 4,920,534 | 4/1990 | Adelmann et al. | 370/94.1 |
| 4,949,301 | 8/1990 | Joshi et al. | 395/427 |
| 4,975,906 | 12/1990 | Takiyasu et al. | 370/85.13 |
| 5,128,931 | 7/1992 | Yamanaka et al. | |
| 5,144,622 | 9/1992 | Takiyasu et al. | 370/85.13 |
| 5,210,744 | 5/1993 | Yamanaka et al. | 370/60 |

FOREIGN PATENT DOCUMENTS

| 0300876 | 7/1988 | European Pat. Off. . |
| 2246646 | of 1990 | Japan . |
| 2228146 | of 1990 | Japan . |
| 0011724 | 5/1990 | Japan . |
| WO88/07298 | 9/1988 | WIPO . |

OTHER PUBLICATIONS

"A Hit-Less Protection Switching Method for ATM Switch". T. Kurano. Autumn Meeting of the Institute of Electonics, Info & Comm. Eng. B-486, 1991.

"A Study of a Hit-Less Protection Scheme for ATM Equipment". T. Koyanagi et al. Autumn Meeting of the Institute of Electronics, Info. & Comm. Eng, B-487, 1991.

Jean-Pierre Coudreuse & Michel Servel "Prelude-An Asynchronous Time-Division Switched Network".

Y.S. Yeh, M.G. Hluchys & A.S. Acampora "The Knockout Switch; A Simple, Modular Architecture For High Performance Packet Switching".

Yoshito Sakurai, Nobuhiko Ido, Shinobu Gohara "Large Scale ATM Multi-Stage Switching Network With Shared Buffer Memory Switches".

(List continued on next page.)

*Primary Examiner*—Tod R. Swann
*Assistant Examiner*—J. Peikari
*Attorney, Agent, or Firm*—Wolf, Greenfield & Sacks, P.C.

[57] ABSTRACT

A multimedia data processing apparatus for exchanging asynchronous transfer mode cells, each cell having a data portion and a header portion including destination information. Cells input through input lines are stored in locations in respective buffer memories selected by an input spatial switch. The locations in the buffer memories are addressable for reading and writing. Cells can be read from the buffer memories in a manner which is independent of the order in which the cells are written. Addresses of the stored cells in the buffer memories are managed for each of the destinations of the cells. In accordance with the managed addresses for each destination, the cells stored in the buffer memories are read and output, through an output line spatial switch to desired output lines connected to the buffer memories.

28 Claims, 22 Drawing Sheets

OTHER PUBLICATIONS

K. Oshima et al., "A New ATM Switch Architecture Based On STS-Type Shared Buffering and Its LSI Implementation", XIV Int'l Switching Symposium, vol. 1, Oct. 1992, pp. 359–363.

The 15th Annual Int. Symp. on Computer Arch., 30.5–2.6 1988, Honolulu, US, pp. 343–354; Tamir et al.: "High performance multi-queue buffers for VLSI communication swithches" p. 344, col. 2, line 2 –p. 345 col. 1, line 24, p. 347 para. 3A., Figs. 1, 2.

IEEE Int'l Conf. on Comm., BOSTONICC/89, Jun. 1989, Boston US; pp. 118–122; Kuwahara et al. "A shared buffer memory switch for an ATM exchange", p. 119, para. 3.1; Fig. 1, 2.

Int'l Switching Symposium 1987, Mar. 1987, Phoenix, US; pp. 367–372; Dieudonne et al; "Switching techniques for asynchronous time division multiplexing (or fast packet switching)", p. 370 –p. 371, para. 6; Fig. 5, 6.

S.X. Wei & V.P. Kumar, "Performance Analysis of a Multiple Shared Memory Module ATM Switch", Int'l Switching Symposium 1992, Yokohama, Japan, Oct. 25–30, 1992, Proceedings vol. 2.

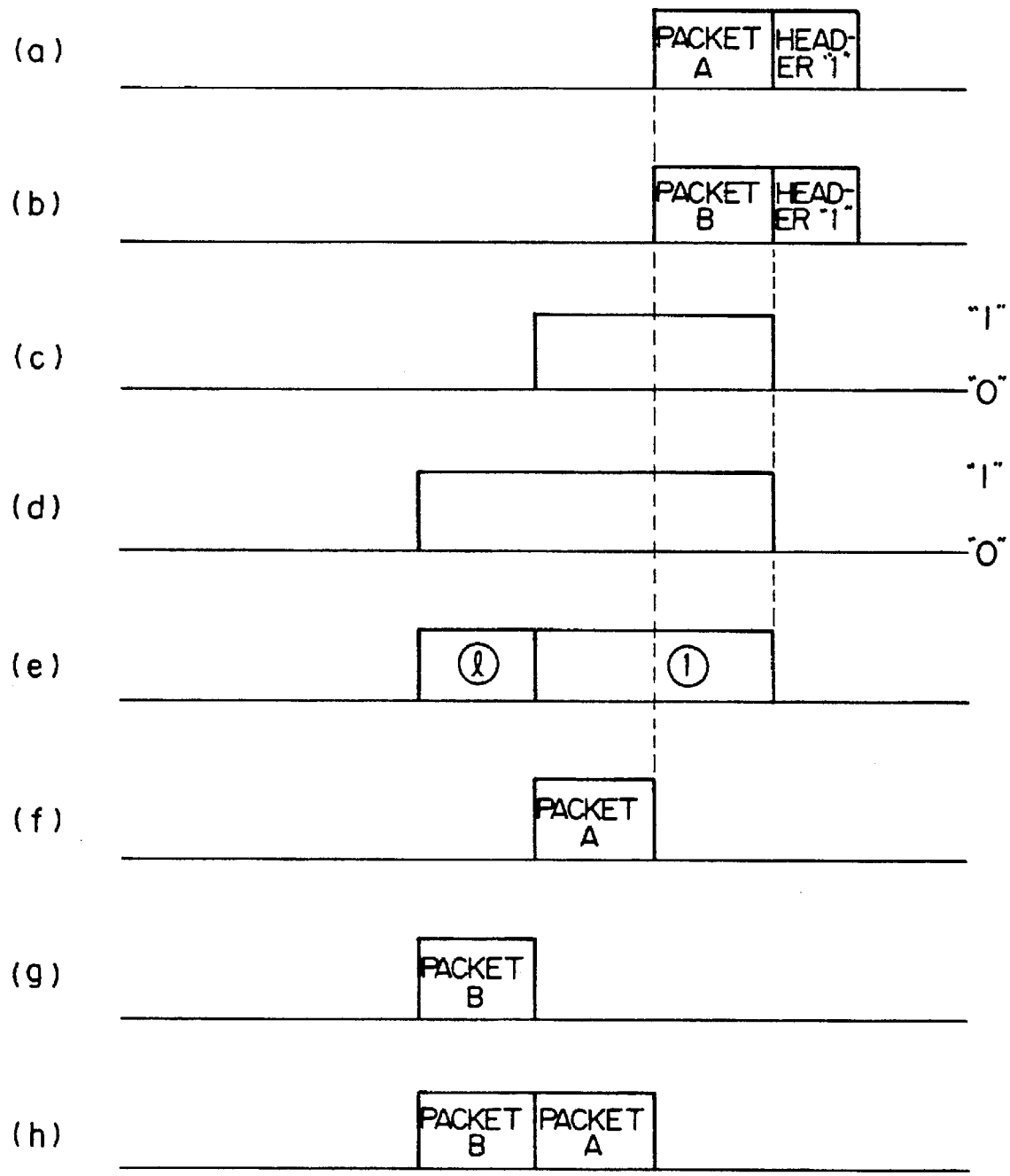

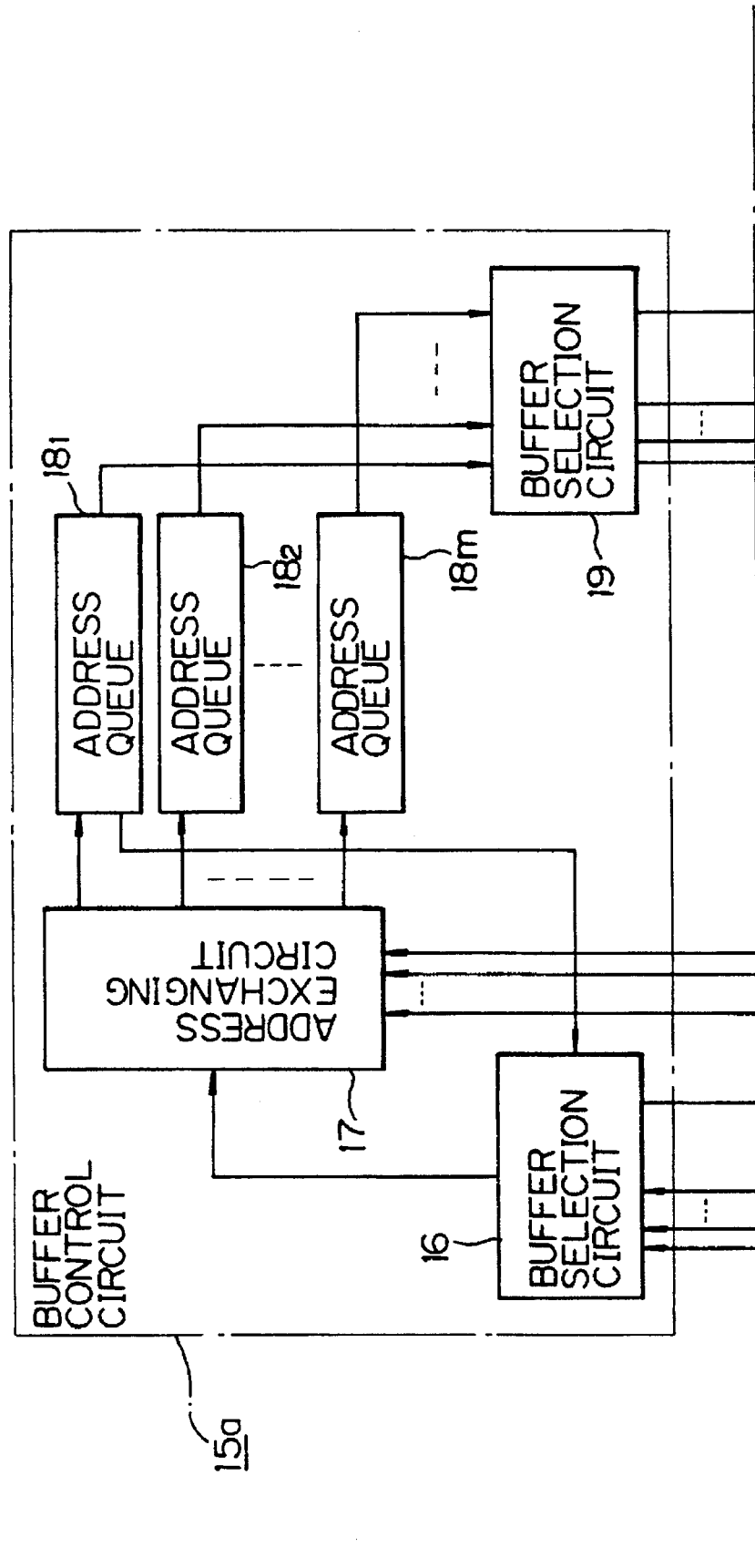

| TIME SLOT | 1 | 2 | 3 | 4 | 5 | 6 | 7 | 8 | 9 | 10 |
|---|---|---|---|---|---|---|---|---|---|---|
| (a) | O1 F1 | O4 F2 | O1 F3 | O2 F4 | | O2 F5 | O2 F6 | O1 F7 | | O4 F8 |
| (b) | O4 G1 | O4 G2 | O2 G3 | O2 G4 | O3 G5 | O2 G6 | O2 G7 | O3 G8 | O3 G9 | |
| (c) | | O4 H1 | O2 H2 | O3 H3 | O2 H4 | O2 H5 | O3 H6 | O4 H7 | | |
| (d) | O3 I1 | | | O2 I2 | O2 I3 | O2 I4 | O2 I5 | O4 I6 | | O1 I7 |
| (e) | | | F1 | | | G4 | G4 | G4 | F6 | F6 | F6 |
| (f) | | | G1 | | | H3 | | | G7 | G7 | G7 |
| (g) | | | I1 | | | I2 | I2 | I2 | (H6)(I2) | H6 |
| (h) | | | | F2 | | | G5 | | I5 | I5 | I5 |
| (i) | | | | G2 | G2 | | | H4 | H4 | H4 | (F7)(H4) | F7 |
| (j) | | | | H1 | H1 | H1 | I3 | I3 | I3 | G8 I3 | (G8)(I3) |
| (k) | | | | F3 | | | F5 | | F5 | F5 H7 F5 | F5 |
| (l) | | | | G3 | | | G6 | | G6 G6 I6 G6 | I6 G6 |
| (m) | | | | H2 | H2 | | H5 | | H5 | H5 | G9 H5 |
| (n) | | | | | | F4 | F4 | I4 | I4 | I4 | I4 |
| (o) | | | O1 F1 | | O1 F3 | | | | | |
| (p) | | | | | | O2 G3 | O2 H2 | O2 F4 | O2 G4 | O2 I2 | O2 H4 |
| (q) | | | O3 I1 | | | O3 H3 | O3 G5 | | | O3 H6 |
| (r) | | | | O4 G1 | O4 F2 | O4 G2 | O4 H1 | | | | O4 H7 |

Fig.4B

| | I1 | I2 | I3 | I4 | I5 | I6 | I7 | I8 | I9 | 20 | 21 | 22 |
|---|---|---|---|---|---|---|---|---|---|---|---|---|
| | | O₃ F9 | | O₃ F10 | O₁ F11 | | | | | | | |
| O₄ G10 | | | O₁ G11 | O₁ G12 | O₂ G13 | O₄ G14 | | | | | | |
| O₁ H8 | O₄ H9 | O₄ H10 | O₄ H11 | O₄ H12 | | | | | | | | |
| O₁ I8 | | | O₂ I9 | | | | | | | | | |
| I7 F6 | F6 | F6 | F6 | H11 F6 | H11 | | | | | | | |
| G7 G10 G7 | G7 | G7 | I9 G7 | I9 G7 | I9 | I9 | | | | | | |
| | H8 | | | F11 | | | | | | | | |
| I5 I8 I5 | I8 I5 | I5 | I5 | G13 I5 | G13 I5 | G13 | G13 | | | | | |
| | F9 | | | H12 | H12 | | | | | | | |
| G8 | H9 | | | G14 | G14 | | | | | | | |
| F5 | | G11 | | | | | | | | | | |
| G6 | G6 | I6 | H10 | | | | | | | | | |
| G9 H5 G9 H5 | H5 | | F10 | | | | | | | | | |
| F8 I4 | I4 | I4 | I4 | G12 | | | | | | | | |
| O₁ F7 O₁ | I7 O₁ | H8 O₁ | I8 O₁ | G11 O₁ | G12 O₁ | F11 | | | | | | |
| O₂ I3 | O₂ F5 | O₂ G6 | O₂ H5 | O₂ I4 | O₂ F6 | O₂ G7 | O₂ I5 | O₂ I9 | O₂ G13 | | | |
| | O₃ G8 | O₃ G9 | O₃ F9 | | O₃ F10 | | | | | | | |
| O₄ I6 | O₄ F8 | O₄ G10 | O₄ H9 | O₄ H10 | | O₄ H11 | O₄ H12 | O₄ G14 | | | | |

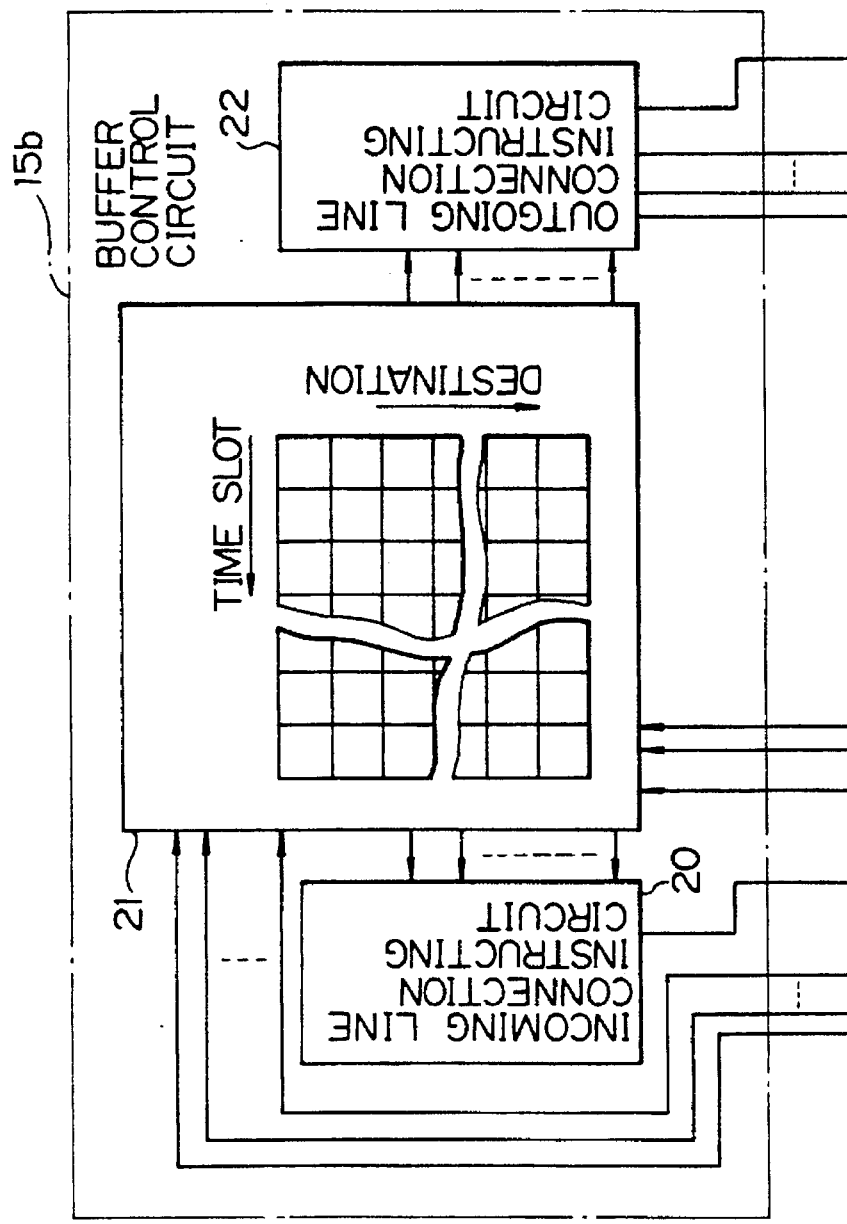

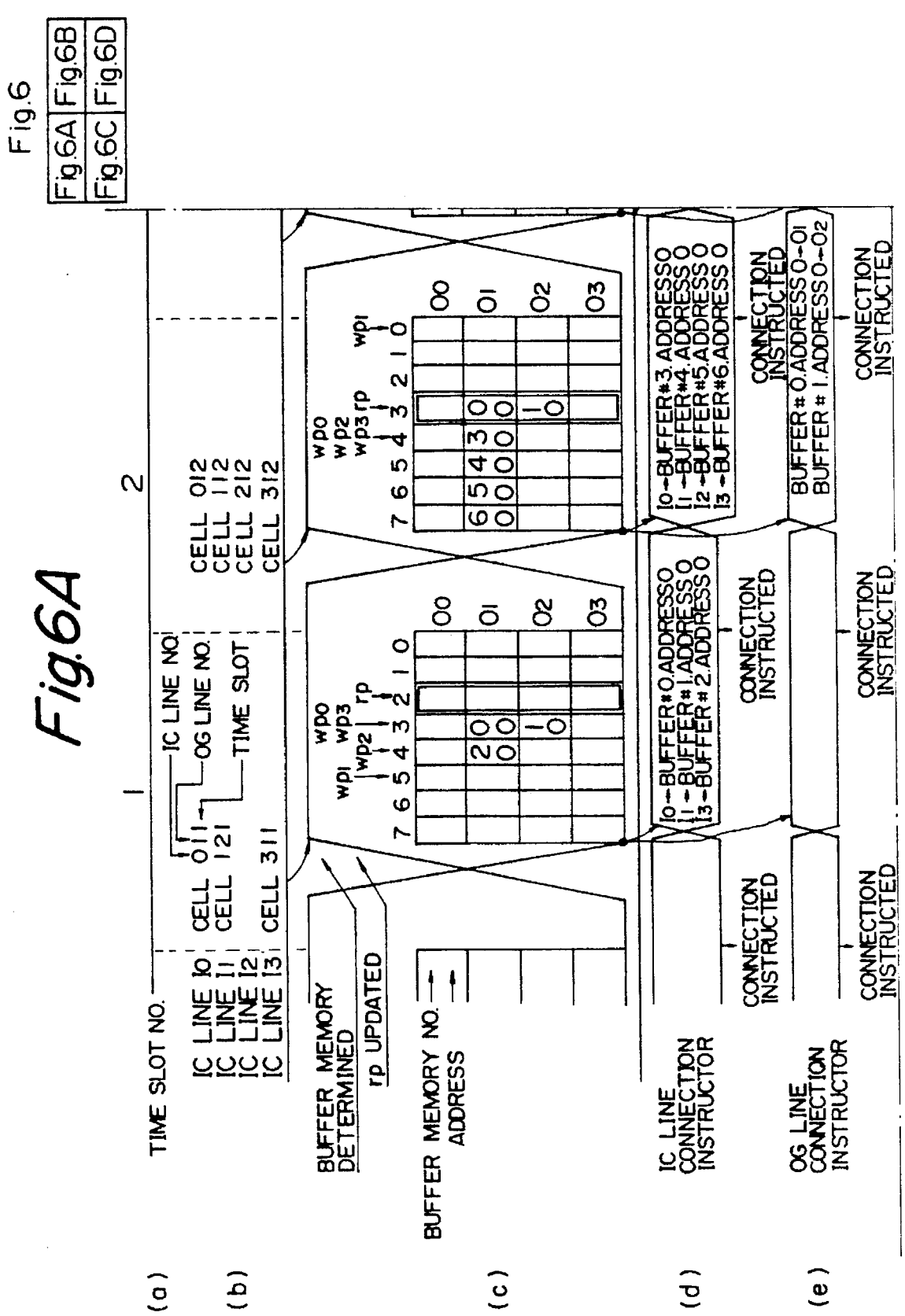

Fig 6D

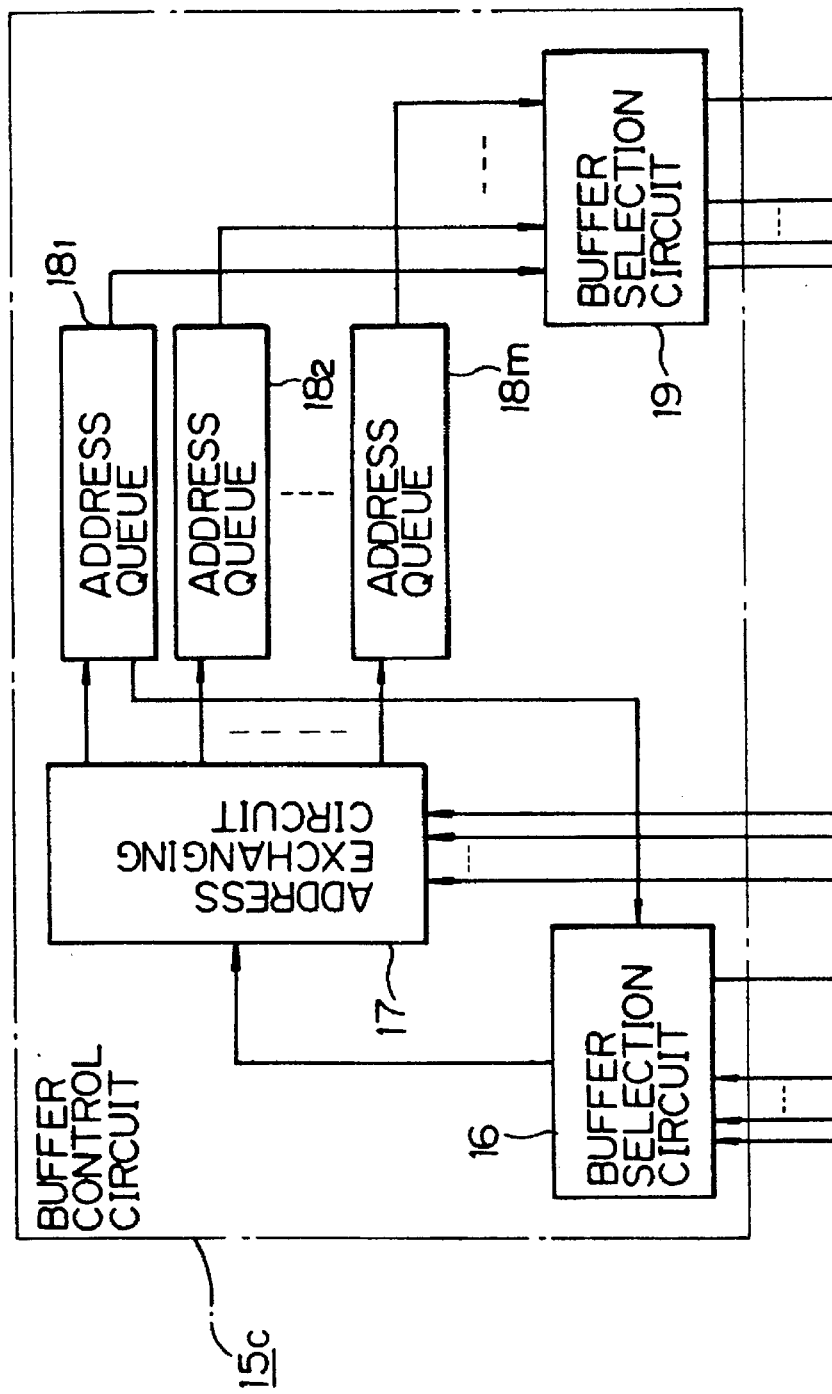

| Fig. 8A | Fig. 8B |

| | 11 | 12 | 13 | 14 | 15 | 16 | 17 | 18 | 19 | 20 | 21 | 22 |
|---|---|---|---|---|---|---|---|---|---|---|---|---|
| | | 03 F9 | | 03 F10 | 01 F11 | | | | | | | |
| | 04 G10 | | 01 G11 | 01 G12 | 02 G13 | 04 G14 | | | | | | |
| | 01 H8 | 04 H9 | 04 H10 | 04 H11 | 04 H12 | | | | | | | |
| | 01 I8 | | | 02 I9 | | | | | | | | |
| | 17 F6 | F6 | F6 | F6 | (H11)(F6) | | | | | | | |
| | G7 | G10 G7 | G7 | G7 I9 G7 | I9 G7 | I9 | I9 | | | | | |
| | | H8 | | | F11 | | | | | | | |
| | I5 I8 | I5 I8 | I5 | I5 | I5 G13 | I5 G13 | I5 | G13 | G13 | | | |
| | | | F9 | | H12 | | | | | | | |
| | | | H9 | | | G14 | | | | | | |
| | F5 | | | G11 | | | | | | | | |
| | G6 | G6 | I6 | H10 | | | | | | | | |
| | G9 H5 | H5 | H5 | | F10 | | | | | | | |
| | F8 | I4 | I4 | I4 | G12 | | | | | | | |
| | | 01 I7 | 01 H8 | 01 I8 | 01 G11 | 01 G12 | 01 F11 | | | | | |
| | 02 I3 | 02 F5 | 02 G6 | 02 H5 | 02 I4 | 02 F6 | 02 G7 | 02 I5 | 02 I9 | 02 G13 | | |
| | 03 G8 | 03 G9 | | 03 F9 | | 03 F10 | | | | | | |
| | 04 I6 | 04 F8 | 04 G10 | 04 H9 | 04 H10 | 04 H11 | 04 H12 | 04 G14 | | | | |

| TIME SLOT | 6 | 7 | 8 | 9 | 10 | 11 | 12 | 13 |
|---|---|---|---|---|---|---|---|---|
| (e) | G4 | G4 | F6 | F6 | F6 | F6 I7 | F6 | F6 |
| (f) |  |  | G7 | G7 | G7 | G7 | G7 G10 | G7 |
| (g) | I2 | I2 | (H6) (I2) |  |  |  | H8 |  |
| (h) | G5 |  | I5 | I5 | I5 | I5 | I5 I8 | I5 I8 |
| (i) | H4 | H4 | H4 | (F7) (H4) |  |  |  | F9 |
| (j) | I3 | I3 | I3 | G8 I3 | (G8) (I3) |  |  | H9 |
| (k) |  | F5 | F5 | H7 F5 | F5 | F5 |  |  |
| (l) |  | G6 | G6 | G6 I6 | G6 I6 | G6 | G6 | I6 |
| (m) |  | H5 | H5 | H5 | H5 I9 | H5 I9 | H5 | H5 |

CELLS HELD IN BUFFER MEMORIES

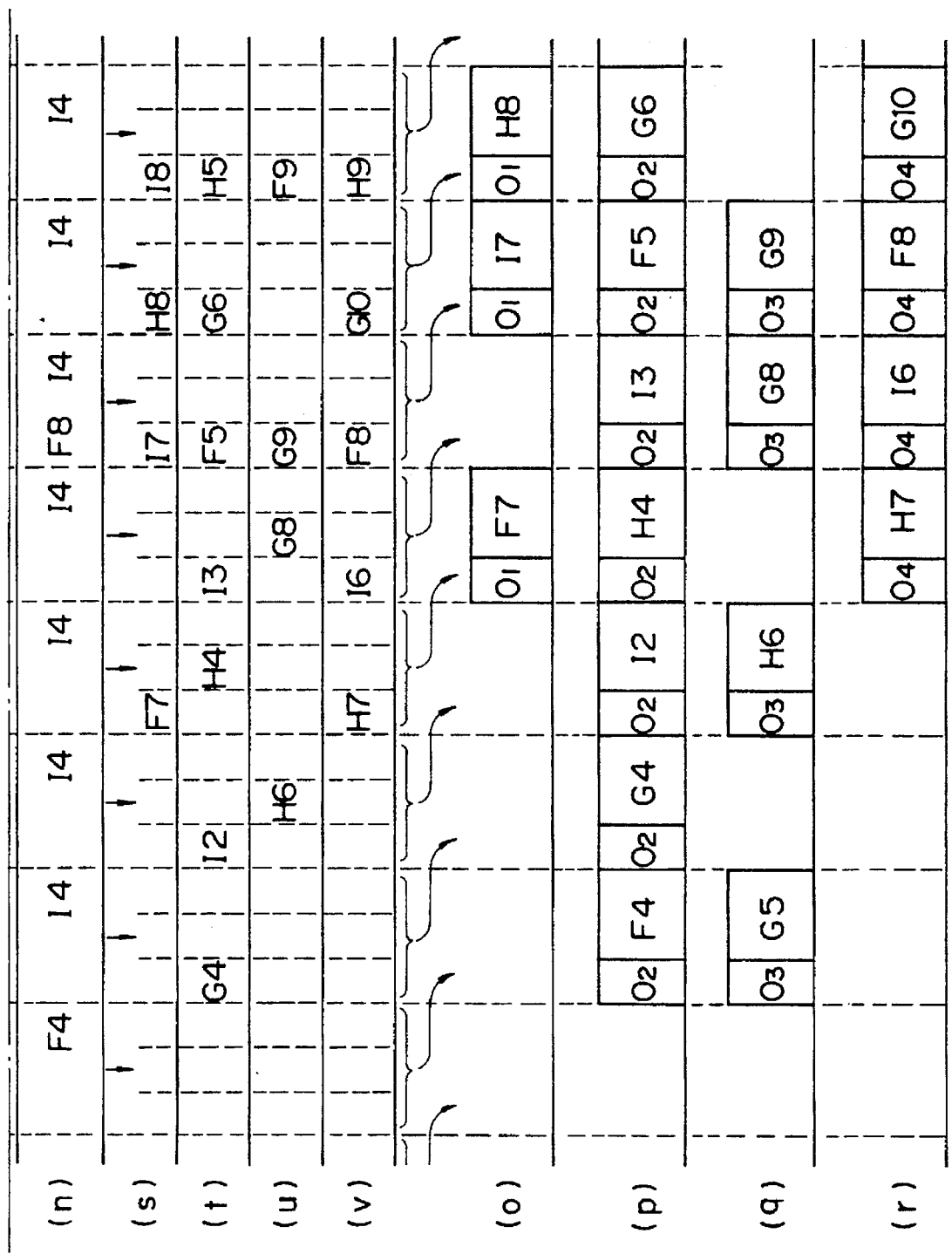

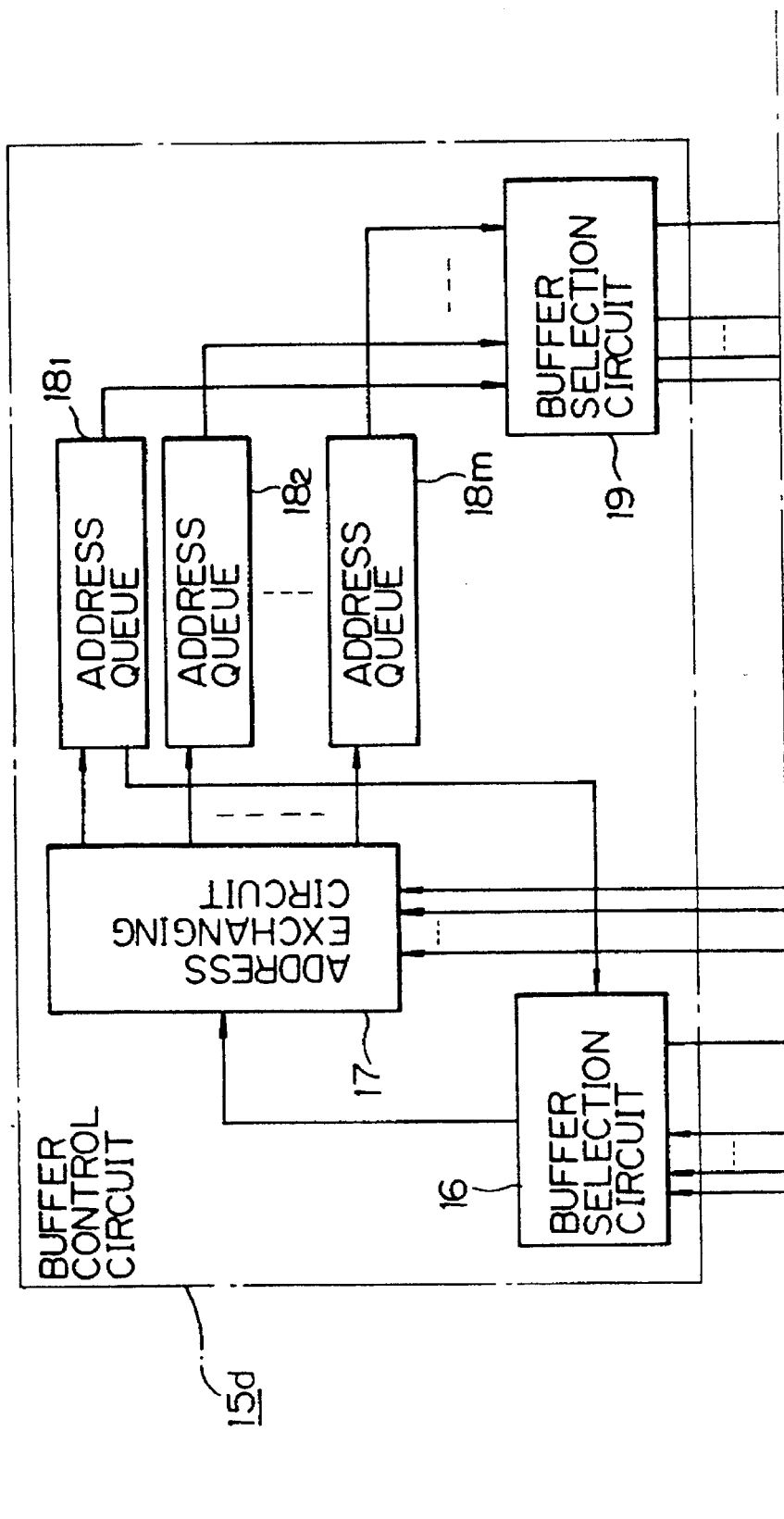

| Fig.11A | Fig.11B |

Fig.11B

| | 12 | 13 | 14 | 15 | 16 | 17 | 18 | 19 | 20 | 21 | 22 |
|---|---|---|---|---|---|---|---|---|---|---|---|
| | H8 F6 | H8 F6 | H8 F6 | H8 F6 | H8 | H8 | H8 | H8 | H8 | H8 | H8 |
| | I7 G7 | I7 G7 | I7 G7 | I7 G7 | I7 G7 | I7 | I7 | I7 | I7 | I7 | I7 |
| | F9 H6 | F9 H6 | F9 H6 | F9 H6 | F9 H6 | F9 H6 | F9 | F9 | F9 | F9 | F9 |
| | G10 I5 | G10 I5 | G10 I5 | G10 I5 | G10 I5 | G10 I5 | G10 I5 | G10 | G10 | G10 | G10 |
| | H9 F7 | H9 F7 | H9 F7 | H9 F7 | H9 F7 | H9 F7 | H9 F7 | H9 F7 | H9 | H9 | H9 |
| | F10 H10 | H10 | | | | | | | | | |
| | I8 H7 | H7 | H7 | H7 | H7 | H7 | H7 | H7 | | | |
| | I6 G6 | I6 | I6 | I6 | I6 | I6 | I6 | I6 | I6 | | |
| | F8 H5 | F8 H5 | F8 | F8 | F8 | F8 | F8 | F8 | F8 | F8 | F8 |
| | G9 I4 | G9 I4 | G9 I4 | G9 | G9 | G9 | G9 | G9 | G9 | G9 | G9 |
| | | O1 F10 | O1 H10 | | | | | | | | |
| | O2 F5 | O2 G6 | O2 H5 | O2 I4 | O2 F6 | O2 G7 | O2 H6 | O2 I5 | O2 F7 | O2 H7 | O2 I6 |
| | | O4 I8 | | | | | | | | | |

# SWITCHING SYSTEM HAVING CONTROL CIRCUIT AND PLURAL BUFFER MEMORIES FOR DATA EXCHANGE IN ASYNCHRONOUS TRANSFER MODE

This application is a continuation of application Ser. No. 07/601,992, filed Oct. 23, 1990, now abandoned.

BACKGROUND OF THE INVENTION

1. Field of the Invention

This invention relates to an asynchronous transfer mode (ATM) cell switching apparatus for exchanging cells at a high speed which are obtained from various information for multimedia, such as voices, data and images, in blocks.

2. Prior Art

FIG. 1 is a block diagram showing a conventional ATM cell exchanging apparatus disclosed in Japanese Patent Disclosure No. 117241/90, for example. In FIG. 1, the reference numerals $1_1-1_n$ designate n ($n \geq 2$) input lines through which packets are input. Each packet has a fixed length and has a header portion including encoded destination information. $2_1-2_m$ designate m ($m \geq 2$) output lines through which the packets are output depending on the destinations specified by the header portions. $3_1-3_l$ designate l ($l \geq n$) buffer memories in which the input packets are temporarily stored. 4 designates an empty buffer selection switch for connecting each of the input lines (i.e., wire, channel, or bus) $1_1-1_n$, through which a packet is input, to an empty one of the buffer memories $3_1-3_l$.

Each of the buffer memories $3_1-3_l$ has a corresponding header memory circuit ($5_1-5_l$) for extracting and storing only the header portions of those packets which are stored in the corresponding buffer memories. Outgoing line selection circuits $6_1-6_l$ are provided, each corresponding to one of the header memory circuits $5_1-5_l$ for making the outputs thereof significant, i.e., "1", from which the stored contents of the corresponding header memory circuits are sent to output lines.

Each of the output lines $2_1-2_m$ has a corresponding encoder $7_1-7_m$ for receiving outputs from the output selection circuits $6_1-6_l$ to encode the outputs as buffer numbers of the buffer memories $3_1-3_l$. First-in, first-out type (hereinafter referred to FIFO) memories $8_1-8_m$ are provided, each having a corresponding encoder $7_1-7_m$ such that the buffer numbers encoded by the encoders $7_1-7_m$ are written into the corresponding FIFO memories and then read out therefrom in the same order that the buffer numbers are input. $9_1-9_m$ are buffer connection switches controlled in accordance with the buffer numbers delivered from the corresponding FIFO memories for outputting the packets stored in the buffer memories to the output lines specified by the header portions of the packets.

Although the packet is used here instead of an ATM cell to describe a transmitted unit of information, both the terms ATM cell and "packet" mean the same thing in that multimedia information is divided into blocks and a header including destination information is added to each block. Generally, however, the two terms are different in that the packet is handled as having blocks of variable length, while the ATM cell is handled as having a fixed length prescribed by CCITT recommendation 1.113 (1988) which deals with asynchronous transfer mode systems.

Operation of a conventional ATM cell exchanging apparatus will now be described. FIG. 2 is a time chart showing a timing relation between signals at the various points. This figure illustrates control flow for receiving, at the same time, packets sent from the input lines $1_1$ and $1_n$ to the output line $2_1$ when the buffer memories $3_1$ and $3_l$ are empty. It is also assumed that the packets handled here have a fixed length as mentioned above and the header portions include, as destination information, encoded output line numbers.

When a packet arrives through any one of the input lines $1_1-1_n$, the empty buffer selection switch 4 selects an empty one of the buffer memories $3_1-3_l$ and connects it to the input line along which the packet has arrived. Here, if two packets, having the same output line number "1", and designating the output line $2_1$, arrive through the input lines $1_1$ and $1_n$ at the same time, as shown in FIGS. 2(a) and 2(b), the empty buffer selection switch 4 selects the input lines $1_1-1_n$ and the buffer memories $3_1-3_l$ one by one in ascending order, for example, and interconnects a selected pair of the input line and the buffer memory. In this case, therefore, the empty buffer selection switch 4 connects the input line $1_1$ to the buffer memory $3_1$ and the input line $1_n$ to the buffer memory $3_l$, whereby a packet A having arrived along the input line $1_1$ is stored in the buffer memory $3_1$ and a packet B having arrived along the input line $1_n$ is stored in the buffer memory $3_l$, respectively.

With the switching operation of the empty buffer selection switch 4, the packet A is also supplied to the header memory circuit $5_1$ corresponding to the buffer memory $3_1$ and the packet B is supplied to the header memory circuit $5_l$ corresponding to the buffer memory $3_l$. The header memory circuits $5_1-5_l$ serve to extract only the header portions of the received packets and to store the contents of the header portions, i.e., the output line numbers. Accordingly, the output line number "1" designating the output line $2_1$ is stored in the header memory circuits $5_1$ and $5_l$. The contents of the header memory circuits $5_1$ and $5_l$ are sent to the corresponding output line selection circuits $6_1$ and $6_l$, respectively. Among the outputs of the output line selection circuit $6_1-6_l$, those outputs which identify the output lines corresponding to the output line numbers specified by the contents of the header memory circuits turn to a significant level, that is, "1", and outputs which identify other output lines remain insignificant, i.e., "0".

Accordingly, the output line selection circuit $6_1$ sets the output to the encoder $7_1$ to "1" as shown in FIG. 2(c), and the output line selection circuit $6_l$ also sets the output to the encoder $7_1$ to "1" as shown in FIG. 2(d). When any one of the outputs of the output line selection circuits $6_1-6_l$ is turned to "1", its corresponding encoder (one of $7_1-7_m$) encodes the buffer number of the buffer memory the output line selection circuit, and causes the encoded buffer number to be stored in the corresponding FIFO memory (one of $8_1-8_m$). When the output of the two output line selection circuits $6_1$ and $6_l$ turn to "1" at the same time as shown in FIGS. 2(c) and 2(d), the encoder $7_1$ causes the buffer numbers to be stored in the FIFO memory in ascending order, for example.

Therefore, the FIFO memory $8_1$ first stores the buffer number ① of the buffer memory $3_1$ and then stores the buffer number ① of the buffer memory $3_l$. Each of the buffer connection switches $9_1-9_m$ reads out the buffer numbers, stored in the FIFO memories $8_1-8_m$, in the order of the buffer numbers stored, and connects the buffer memories designated by the read-out buffer numbers to the output line connected to the buffer connection switch.

Specifically, as shown in FIG. 2(e), the buffer connection switch $9_1$ first reads the buffer number ① out of the FIFO memory $8_1$ and, after the completion of the necessary connection process, reads the next buffer number ① therefrom. When the buffer number ① is read out, the buffer memory $3_1$ is connected to the output line $2_1$ and the packet A stored in the buffer memory $3_1$ is output to the output line $2_1$ as shown in FIG. 2(f). After the completion of outputting the packet A to the output line $2_1$, the buffer number ① is read out as mentioned above, whereupon the buffer memory $3_l$ is connected to the output line $2_1$ and the packet B stored in the buffer memory $3_l$ is output to the output line $2_1$, as shown in FIG. 2(g). As a result, the packets A and B are output to the output line $2_1$, successively, as shown in FIG. 2(h).

Whenever a packet is delivered to one of the outgoing line $2_1$-$2_m$, the buffer connection switches $9_1$-$9_m$ release a corresponding one of the buffer memories $3_1$-$3_l$ and inform the empty buffer selection switch 4 of that fact so as to make it ready for receiving further packets.

In the conventional ATM cell exchanging apparatus, only one ATM cell can be stored in each of the buffer memories $3_1$-$3_l$ thus avoiding any collision between ATM cells (packets) when the ATM cells are read out of the buffer memories. If the number of ATM cells to be written exceeds the number of buffer memories $3_1$-$3_l$, the excessive ATM cells are discarded. To reduce the number of discarded ATM cells, a large quantity of buffer memories is required. This necessarily increases the size of the empty buffer selection switch 4 for connecting the input lines to the buffer memories and the buffer connection switches for connecting the buffer memories to the output lines $2_1$-$2_m$.

SUMMARY OF THE INVENTION

The objects of this invention are to solve the problems explained above, and to provide an ATM cell exchanging apparatus which can reduce the number of ATM cells discarded due to collisions by using a small number of buffer memories, and which can also reduce the size of switching devices for connecting the buffer memories to input lines and output lines.

To achieve these objects, a cell exchanging apparatus of the present invention comprises header processing circuits, connected to corresponding input lines, for detecting destinations from header portions of ATM cells received through the incoming lines, and a plurality of buffer memories capable of storing the ATM cells in locations specified by addresses and reading out the stored ATM cells in response to specified addresses independently of the order in which ATM cells were stored. According to one aspect of the present invention, the header processing circuits are connected to the buffer memories through an input line spatial switch, and the buffer memories are connected to the output lines through an output line spatial switch. A buffer control circuit controls the input line spatial switch to select the buffer memories into which the cells are to be written, and manages the addresses of the written ATM cells in the buffer memories for each of the destinations of the ATM cells. The buffer control circuit also controls the output line spatial switch in accordance with those addresses under management so that the ATM cells may be output to the specified output lines in any order.

Thus, the ATS cells input through the input lines are stored in the buffer memories selected by the input line spatial switch after detection of the ATM cell destinations. The addresses of the stored ATM cells in the buffer memories are managed for the destination of each of the ATM cells. In accordance with the addresses under management for each destination, the buffer memories are accessed to cause the ATM cells stored therein to be read out and output to the output lines connected to the buffer memories through the output line spatial switch. Consequently, when reading the ATM cells out of the buffer memories, a plurality of ATM cells can be led to the output lines through the spatial switch while avoiding collision between ATM cells. Also, a processing speed (rate) is the same throughout the circuits, whereby the ATM cells can be exchanged without any necessity to increase such a speed. Furthermore, the number of buffer memories can be reduced, which enables a reduction in the number of ATM cells discarded when the number of written cells exceeds the capacity of the buffer memories, without any necessity to increase the size of the spatial switches for connecting the buffer memories to the input lines and the output lines.

According to another aspect to the present invention, the ATM cells input through the input lines are held in the header processing circuits for a period of one time slot. The buffer memories are provided in number equal to or greater than the sum of the number of input lines and the number of output lines, less one. The buffer control circuit controls the input line spatial switch such that the ATM cells held in the header processing circuits are written in the buffer memories which are selected so as to avoid overlapping of the ATM cells, i.e., to prevent a plurality of ATM cells from being written in one buffer memory at the same time within one time slot. The output line spatial switch is controlled such that, when the ATM cells have already been written in the buffer memories and are managed using the addresses in the buffer memories for each of the destinations and for each of the reading time slots so as to avoid the overlapping of the destinations within the same time slot, the ATM cells are output to the output lines specified by the cell header portions in a predetermined order.

Thus, by setting one time slot as the operation cycle unit, the ATM cells held in the header processing circuits are written in selected buffer memories so as to avoid the overlapping of the ATM cells within one time slot. The cells which are managed using the addresses in the buffer memories for each of the destinations and reading time slots so as to avoid the overlapping of the destinations within the same time slot are read out to the output lines specified by the header portions. Consequently, it is possible to reduce the number of ATM cells discarded due to collision therebetween or delay of the ATM cells during the writing and reading operations.

According to still another aspect of the present invention, output line speed adjusting buffers, connected to the buffer memories through the output line spatial switch for storing the ATM cells to adjust an output line speed are additionally provided, one for each of the output lines. The buffer control circuit controls the input line spatial switch to select the buffer memories in which the ATM cells are to be written, to manage the addresses of the ATM cells written in the buffer memories for each destination, to read the ATM cells out of the buffer memories in accordance with those addresses under management in a predetermined order at a speed r ($2 \leq r <$ number of output lines) times the output line speed, to control the output line spatial switch to write the readout ATM cells in the specified output line speed adjusting buffers in a predetermined order, and to read out those written ATM cells in accordance with the output line speed to output the ATM cells to the output lines.

Thus, the ATM cells, the destinations of which have been detected, are stored in the selected buffer memories. The addresses of the ATM cells stored in the buffer memories are managed for each destination, and the buffer memories are accessed in accordance with those addresses for reading out the stored ATM cells at a speed r ($2 \leq r <$ number of output lines) times the output line speed. Consequently, when reading the ATM cells out of the buffer memories, a plurality of ATM cells can be led to the output lines through the spatial switch so as to avoid any collision between ATM cells, while allowing the ATM cells up to a number of r to be read out of the same buffer memory in overlapped relation. The reading speed is raised as high as r times the output line speed at its maximum and, therefore, the ATM cells can be exchanged without any necessity to increase the speed. Because the opportunities of reading the ATM cells out of the same buffer memory is increased, it is possible to reduce further the number of ATM cells discarded by collision during the reading operation.

According to still another aspect of the present invention, input line speed adjusting buffers for storing the ATM cells to adjust an input speed are additionally provided in correspondence to the input lines. The buffer control circuit functions to control the output line spatial switch to control the connection between the buffer memories and the output lines, to control the input line spatial switch to select the buffer memories in which the ATM cells are to be written, to write the ATM cells read out of the input line speed adjusting buffers to the selected buffer memories at a speed w ($2 \leq w <$ number of input lines) times the input line speed, to manage the addresses of the ATM cells written in the buffer memories for each destination, and to control the output line spatial switch in accordance with those addresses under management to output the ATM cells to the specified output lines in a predetermined order.

Thus, the ATM cells for which destinations have been detected are written in the buffer memories selected by the input line spatial switch as a speed w ($2 \leq w <$ number of input lines) times the input line speed. The addresses of the ATM cells stored in the buffer memories are managed for each destination, and the buffer memories are accessed in accordance with those addresses for reading out the stored ATM cells. Consequently, even in a condition that the buffer memories become almost full with ATM cells and a plurality of ATM cells must be written in one buffer memory in one time slot, it is possible to write up to w ATM cells in one buffer memory. Also, when reading the ATM cells out of the buffer memories, a plurality of ATM cells can be led to the output lines through the spatial switch, while avoiding collisions between ATM cells. The writing speed is raised as high as w times the input line speed at its maximum and, therefore, the ATM cells can be exchanged without any necessity to increase the speed. As a result, it is possible reduce further the number of ATM cells discarded due to collision during the writing operation.

The above and other objects and advantages of the present invention will be become clearer from reading the following description with reference to the accompanying drawings which illustrate several preferred embodiments by way of example.

BRIEF DESCRIPTION OF THE DRAWINGS

FIG. 2 is a time chart showing a timing relation between signals at various points in the ATM cell exchanging apparatus of FIG. 1.

FIGS. 3A and 3B are a block diagram showing an ATM cell exchanging apparatus according to a first embodiment of the present invention;

FIGS. 4A and 4B are a time chart showing a timing relation between signals at various points in the ATM cell exchanging apparatus of FIG. 3;

FIGS. 5A and 5B are a block diagram showing an ATM cell exchanging apparatus according to a second embodiment of the present invention;

FIGS. 6A, 6B, 6C and 6D are a time chart showing a timing relation between signals at various points in the ATM cell exchanging apparatus of FIG. 5;

FIGS. 7A and 7B are a block diagram showing an ATM cell exchanging apparatus according to a third embodiment of the present invention;

FIGS. 8A and 8B are a time chart showing a timing relation between signals at various points in the ATM cell exchanging apparatus of FIG. 7;

FIGS. 9A and 9B are an enlarged time chart showing an main part of the time chart of FIG. 8;

FIGS. 10A and 10B are a block diagram showing an ATM cell exchanging apparatus according to a fourth embodiment of the present invention; and FIGS. 11A and 11B are a time chart showing a timing relation between signals at various points in the ATM cell exchanging apparatus of FIG. 10.

DETAILED DESCRIPTION OF THE PREFERRED EMBODIMENTS

Figure 1:
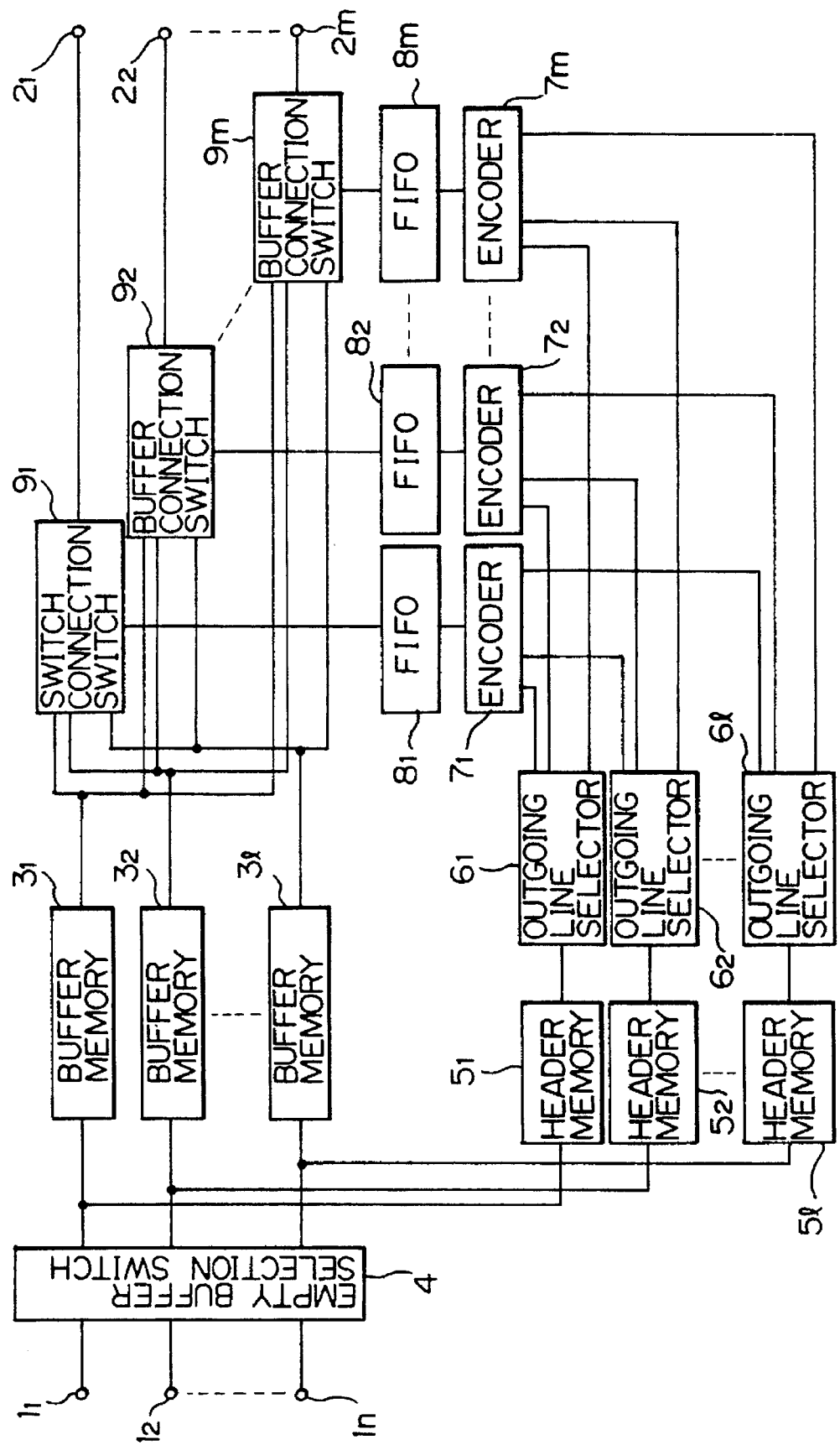
FIG. 1 is a block diagram showing a conventional ATM cell exchanging apparatus.
Figure 3B:
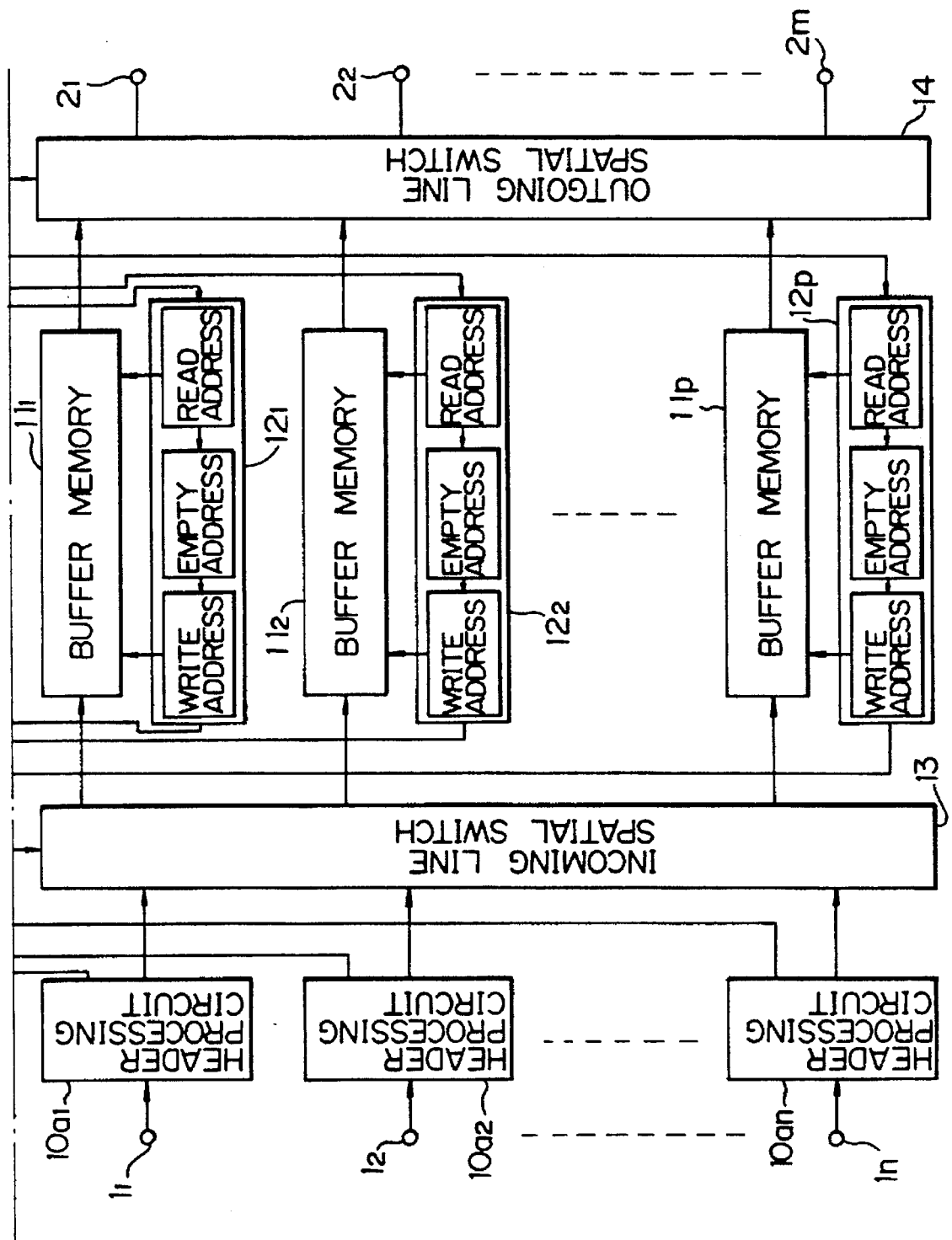

Hereinafter, several preferred embodiments of the present invention will be described by referring to the drawings. Also, hereinafter, the terms "cell" and "ATM cell" should be taken to refer interchangeably to asynchronous transfer mode (ATM) cells. FIG. 3 is a block diagram showing the structure of a cell exchanging apparatus according to a first embodiment of the present invention, In FIG. 3, denoted by $1_1$–$1_n$ are n ($n \geq 2$) input lines through which cells are input, each cell comprising a data portion and a header portion including an output line number as destination information. $2_1$–$2_m$ designates m ($m \geq 2$) output lines through which the cells are output depending on the designations specified by their header portions. The above arrangement is identical to that shown in FIG. 1.

Denoted by $10a_1$–$10a_n$ are header processing circuits provided correspond to the input lines $1_1$–$1_n$, respectively, for detecting the output lines designated by the header portions of the cells received through the input lines. $11_1$–$11_p$ designate p ($p \geq 2$) buffer memories, each buffer memory being capable of storing cells at locations specified by addresses and reading out the stored cells by specifying the addresses regardless of the order in which the cells are stored or written. These buffer memories $11_1$–$11_p$ are different from the conventional buffer memories $3_1$–$3_l$ shown in FIG. 1 in that a plurality of cells can be stored in each buffer memory. $12_1$–$12_p$ designate storage control circuits provided to correspond to the buffer memories $11_1$–$11_p$, respectively, each storage control circuit supervising empty addresses using, for example, an FIFO-type memory to give an associated one of the buffer memories $11_1$–$11_p$ READ and WRITE addresses.

Denoted by 13 is an input line spatial switch for selectively connecting the header processing circuits $10a_1$–$10a_n$ to predetermined buffer memories $11_1$–$11_p$, and 14 designates an output line spatial switch for selectively connecting the buffer memories $11_1$–$11_p$ to predetermined output lines $2_1$–$2_m$. The switch is called "spatial" because the switch provided for input lines connects to the respective buffer memories cells reaching control lines indicative of connection and configuration, that is, the respective input lines. Each control line is switched in the unit of one cell. The cells reaching the respective input lines are assumed to be synchronized with each other. The switch may be realized by a cross point switch having contacts, the number of which is equal to the number of input lines multiplied by the number of output lines. The switch provided for the output lines can also be structured as described above.

Denoted by 15a is a buffer control circuit which functions to (i) control a switching operation of the input line spatial switch 13 to select the buffer memories in which cells are to be stored, (ii) manage the addresses of the stored cells in the buffer memories on the basis of the respective destinations of the cells, and (iii) control a switching operation of the output line spatial switch 14 in accordance with the addresses under management for the respective destinations, thereby outputting the cells, in a predetermined order, to the output lines specified by the cell headers.

The buffer control circuit 15a comprises a first buffer selection circuit 16 which, when a cell arrives along one of the output lines $1_1$–$1_n$, receives the output line number of the cell detected by the header processing circuits $10a_1$–$10a_n$ associated with that output line, selects one of the buffer memories $11_1$–$11_p$ in which the cell is to be stored, and controls a switching operation of the output line spatial switch 13 so that the selected buffer memory is connected to the cell-detecting header processing circuit. 17 designates an address exchanging circuit which functions to sort out the arriving cells on the basis of the destinations, i.e., the output lines, by referring to the output line numbers detected by the buffer selection circuit 16, and obtain, from the storage control circuits associated with the buffer memories, the WRITE addresses in the buffer memories in which the cells are written to write the obtained WRITE addresses in address queues (described later).

Address queues $18_1$–$18_m$, each including a FIFO-type memory and are provided to correspond to the output lines $2_1$–$2_m$, respectively. The address exchanging circuit 17 writes, in the address queues, the WRITE addresses in the buffer memories in which the cells destined for the output lines are stored, in the order in which the addresses arrive, for every output lines $2_1$–$2_m$ corresponding to the address queues. A second buffer selection circuit 19 determines the cells to be read out of the buffer memories by referring to the address queues $18_1$–$18_m$, sends the address read out of the address queues, as READ addresses, to the storage control circuits associated with the corresponding buffer memories, and controls a switching operation of the output line spatial switch 14 to cause the buffer memories to the corresponding output lines.

An operation of this ATM cell exchanging apparatus will be described below. FIG. 4 is a time chart showing a timing relation between signals at various points in the ATM cell exchanging apparatus. The time chart illustrates a control flow in which the number n of the input lines $1_1$–$1_n$ and the number m of the output lines $2_1$–$2_m$ are respectively four (4) and the number p of the buffer memories $11_1$–$11_p$ is ten (10). It is also assumed that the cells handled here are input at random and have a fixed length, and that the phases of the respective cells are adjusted prior to being input to the input lines $1_1$–$1_n$ in such a manner that the cells are supplied at the same phase through all the input lines.

FIGS. 4(a)–4(d) show examples of the cells input to the input lines $1_1$–$1_4$. FIGS. 4(e)–4(n) show examples of the cells stored in the buffer memories $11_1$–$11_{10}$ in that case, and FIGS. 4(o)–4(r) show examples of the cells output to the output lines $2_1$–$2_4$. It is assumed that all the circuits are synchronized with each other, and one cell per one time slot can be input and output.

When the cells are input to the input lines, the header processing circuits $10a_1$–$10a_4$ provided in correspondence with the input lines $1_1$–$1_4$, respectively, detect the output line numbers from the header portions of the input cells. While referring to the header processing circuits $10a_1$–$10a_4$, the first buffer selection circuit 16 of the buffer control circuit 15a instructs the input line spatial switch 13 to respectively connect the input lines along which the cells have arrived to the buffer memories which are selected for storing the cells.

The manner in which the input line spatial switch 13 connects between the input lines and the buffer memories can be described in various ways. It is undesirable that two or more cells to be read exist in the same buffer memory at the time the cells are stored and then read out of the buffer memories. To avoid this, the cells are preferably distributed to a number of buffer memories. To accomplish this the same number of buffer memories as that of the input lines is not sufficient. Control is facilitated by using as many buffer memories as possible. As a simpler example of control, it can also be envisaged to select a buffer memory which holds the least number of cells therein, and to write cells in the buffer memory. In other words, when x cells arrive simultaneously, x buffer memories which hold the least number of cells therein are selected, and the input lines receiving the x cells are spatially connected to the selected buffer memories.

FIG. 4 shows, as a further simpler example of control, a manner in which the buffer memories $11_1$–$11_{10}$ are sequentially selected and arriving cells are written in the buffer memories. In other words, the buffer memories $11_1$, $11_2$, $11_3$, ... $11_{10}$ are written therein successively. In a time slot 1, the first cell of a signal f (referred to as an "F1 cell" hereinafter; the remaining cells are similarly referred to) is input from the input line $1_1$, a G1 cell of a signal g from the input line $1_2$, and an I1 cell of a signal i from the input line $1_4$. The header portion of the respective cells include output line numbers; that is, the F1 cell has the number $0_1$ specifying the output line $2_1$, the G1 cell has $0_4$ specifying the output line $2_4$, and the I1 cell has $0_3$ specifying the output line $2_3$, respectively. In a time slot 2, the input line spatial switch 13 connects the input line $1_1$ to the buffer memory $11_1$, the input line $1_2$ to the buffer memory $11_2$, and the input line $1_4$ to the buffer memory $11_3$, respectively. Therefore, these cells are stored, in the time slot 2, in the buffer memories $11_1$–$11_4$ at the addresses specified by the storage control circuits $12_1$–$12_3$. At this time, the storage control circuits $12_1$–$12_3$ send the WRITE addresses of the buffer memories to the address exchanging circuit 17. The WRITE addresses are selected from among those addresses which are managed by the storage control circuits $12_1$–$12_3$ as empty addresses. The address exchanging circuit 17 sorts out the input cells for each destination output line in reference to the first buffer selection circuit 16, and writes the WRITE address of the buffer memory $11_1$ in the tail end of the address queue $18_1$, the WRITE address of the buffer memory $11_2$ in the tail end of the address queue $18_4$, and the WRITE address of the buffer memory $11_3$ in the tail end of the address queue $18_3$, respectively.

Then, in a time slot 3, the second buffer selection circuit 19 takes out the addresses stored in the address queues $18_1$–$18_3$, sends the addresses to the storage control circuits $12_1$–$12_3$ associated with the buffer memories $11_1$–$11_3$, and instructs the output line spatial switch 14 to connect the buffer memories $11_1$–$11_3$ to the output lines $2_1$, $2_3$ and $2_4$, respectively. The output line spatial switch 14 connects the buffer memory $11_1$ to the output line $2_1$, the buffer memory $11_2$ to the output line $2_4$ and the buffer memory $11_3$ to the output line $2_3$, respectively, in the time slot 3. The storage control circuits $12_1$–$12_3$ send the received addresses to the associated buffer memories $11_1$–$11_3$ as READ addresses and, thereafter, manage those addresses as empty ones. The cells read out of the respective buffer memories $11_1$–$11_3$ are output to the destination output lines $2_1$, $2_4$ and $2_3$ specified by their headers, respectively.

While the output lines specified by the input cells are different from one another in the above example, the cells input in the time slot 2 have the header portions specifying the same destination output lines. An F2 cell, a G2 cell and an H1 cell input in the time slot 2 are respectively written in the buffer memories $11_4$, $11_5$ and $11_6$ in a like manner, but the header portions of these three cells include the output line number $0_4$ specifying the same output line $2_4$. In the example of FIG. 4, higher priority is given for an input line of a smaller number, thereby to causing cells to be delayed. The F2, G2 and H1 cells are read out of the buffer memories $11_4$, $11_5$ and $11_6$ in this order in time slots 4, 5 and 6, respectively, and output to the output line $2_4$. Subsequently, such cell exchange will be executed in the manner described above.

In a time slot 8, an I2 cell and an H6 cell are stored in the buffer memory $11_3$. Although these I2 and H6 cells have different destinations, i.e., the output line $2_2$ and the output line $2_3$, respectively, they are stored in the same buffer memory $11_3$ and hence cannot be taken out simultaneously. In such a case, a collision of the two cells can be avoided by giving the output lines $2_1$–$2_4$ fixed preferential orders or variable preferential orders to be changed on the basis of a random number and by taking out only one cell, e.g., the I2 cell while delaying the other H6 cell. A similar event also occurs in other time slots 9, 10 and 15, but not cell is lost due to collision.

In the ATM cell exchanging apparatus according to the first embodiment, as described above, the cells input through the input lines are stored in the respective buffer memories selected by the input line spatial switch, after the detection of the cell destinations. The addresses of the stored cells in the buffer memories are managed for each of the destinations of the cells. In accordance with the addresses under management for each destination, the buffer memories are accessed for reading out the cells stored therein and outputting those cells to desired output lines connected to the buffer memories through the output line spatial switch. As a result, it is possible to achieve an ATM cell exchanging apparatus which can lower the number of discarded cells due to collision by using a relatively small number of buffer memories, and can reduce the size of switch devices for connecting the buffer memories to input and outgoing lines.

Figure 5B:
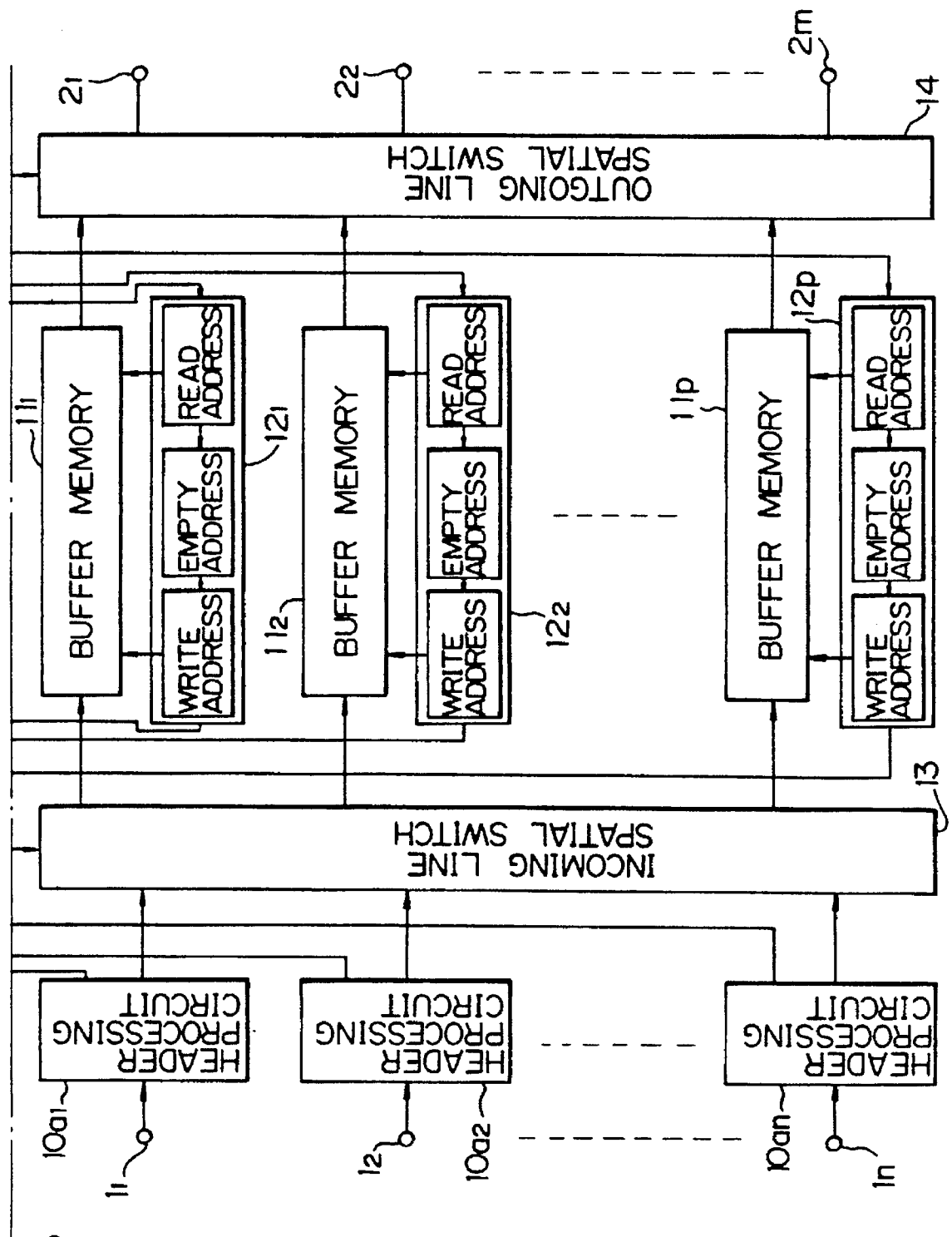

FIG. 5 is a block diagram showing the construction of an ATM cell exchanging apparatus according to a second embodiment of the present invention. In FIG. 5, the same or corresponding elements are denoted by the same reference numerals as in the ATM cell exchanging apparatus according to the first embodiment and not explained here.

Referring to FIG. 5, header processing circuits $10b_1$–$10b_n$ are provided to correspond with the input lines $1_1$–$1_n$, respectively for detecting the output lines from the header portions of the cells input through the input lines and for holding the cells therein for a period of one time slot. The buffer memories $11_1$–$11_p$ are provided in a number corresponding to p=(n+m−1). $15b$ designates a buffer control circuit which (i), for a period of one time slot, controls a switching operation of the input line spatial switch 13 to select the buffer memories in which the cells are to be written (i.e., the writing of cells), (ii) manages, for each of the destination of the cells and for each time slot for reading out the cells, the addresses of the stored cells in the buffer memories and (iii) outputs the cells in each reading time slot to the output lines specified by their headers in a predetermined order.

The buffer control circuit $15b$ comprises an address table 21 provided in correspondence to the output lines $2_1$–$2_m$. When the cells arrive through the input lines, the address table 21 receives the output line numbers of the arriving cells which are detected by the header processing circuits associated with the input lines, and selects the buffer memories in which the cells are to be stored, and then stores the buffer memory numbers and the corresponding WRITE addresses in the table for each of the destination output lines. 20 designates an input line connection instructing circuit which receives the number of the buffer memories storing the cells determined by the address table 21 and the WRITE addresses and controls a switching operation of the input line spatial switch 13 to connect between the header processing circuits $10b_1$–$10b_n$ and the buffer memories $11_1$–$11_p$. 22 designates an output line connection instructing circuit which determines the cells to be read out of the buffer memories in reference to the address table 21, sends the addresses read out of the address table 21, as READ addresses, to the storage control circuits associated with the buffer memories, and controls a switching operation of the output line spatial switch 14 to connect the buffer memories to the corresponding output lines respectively.

An operation of this ATM cell exchanging apparatus will be described below. FIG. 6 is a time chart showing a timing relation between signals at various points in the ATM cell exchanging apparatus. The time chart illustrates a control flow in which the number n of the input lines $1_1$–$1_n$ and the number m of the output lines $2_1$–$2_m$ are each four (4) and the number p of the buffer memories $11_1$–$11_p$ is equal to (n+m−1), i.e., seven (7). It is also assumed that the cells handled here have a fixed length, and that the input phases of the respective cells are adjusted prior being input to the input lines $1_1$–$1_n$ in such a manner that input cells are supplied at the same phase through all the input lines. For convenience of explanation, those input lines $1_1$–$1_4$ are indicated by $I_0$, $I_1$, $I_2$ and $I_3$, and those output lines $2_1$–$2_4$ are indicated by $0_0$, $0_1$, $0_2$ and $0_3$, respectively. Further, the buffer memories $11_1$–$11_7$ are indicated by buffer #0, buffer #1 . . . , buffer #6, respectively.

Figure 6B:
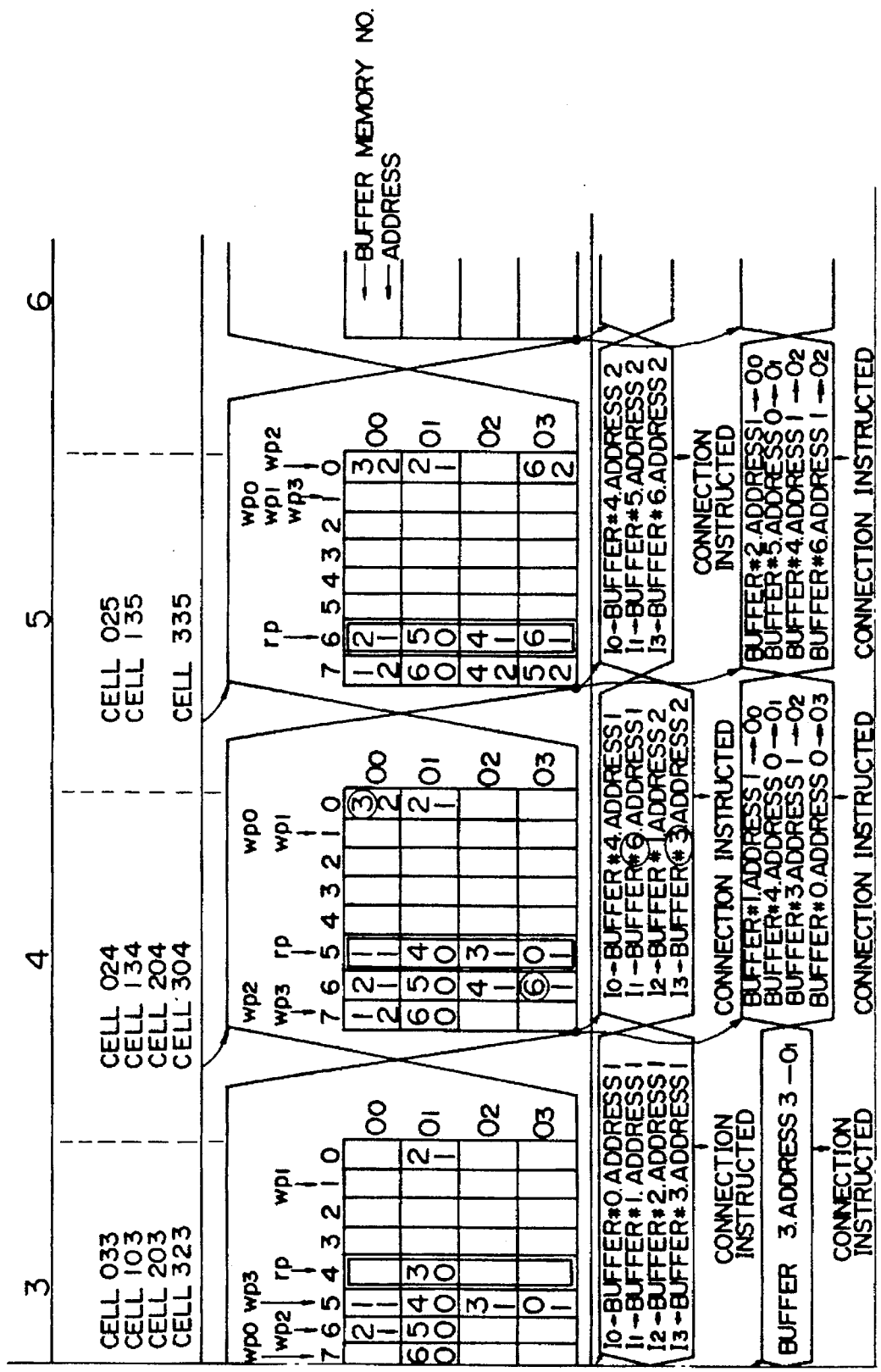
Figure 6C:
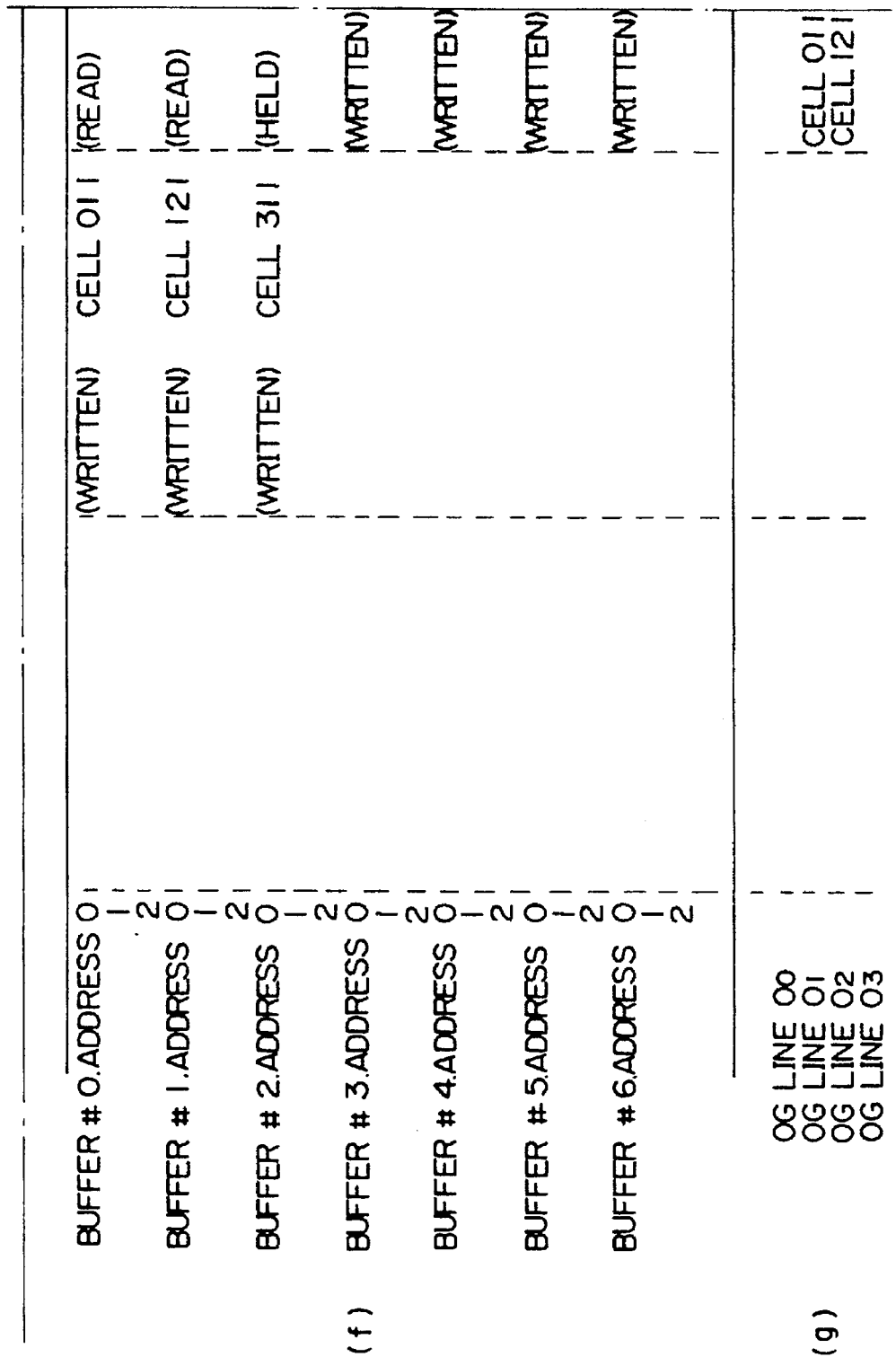
Figure 6D:
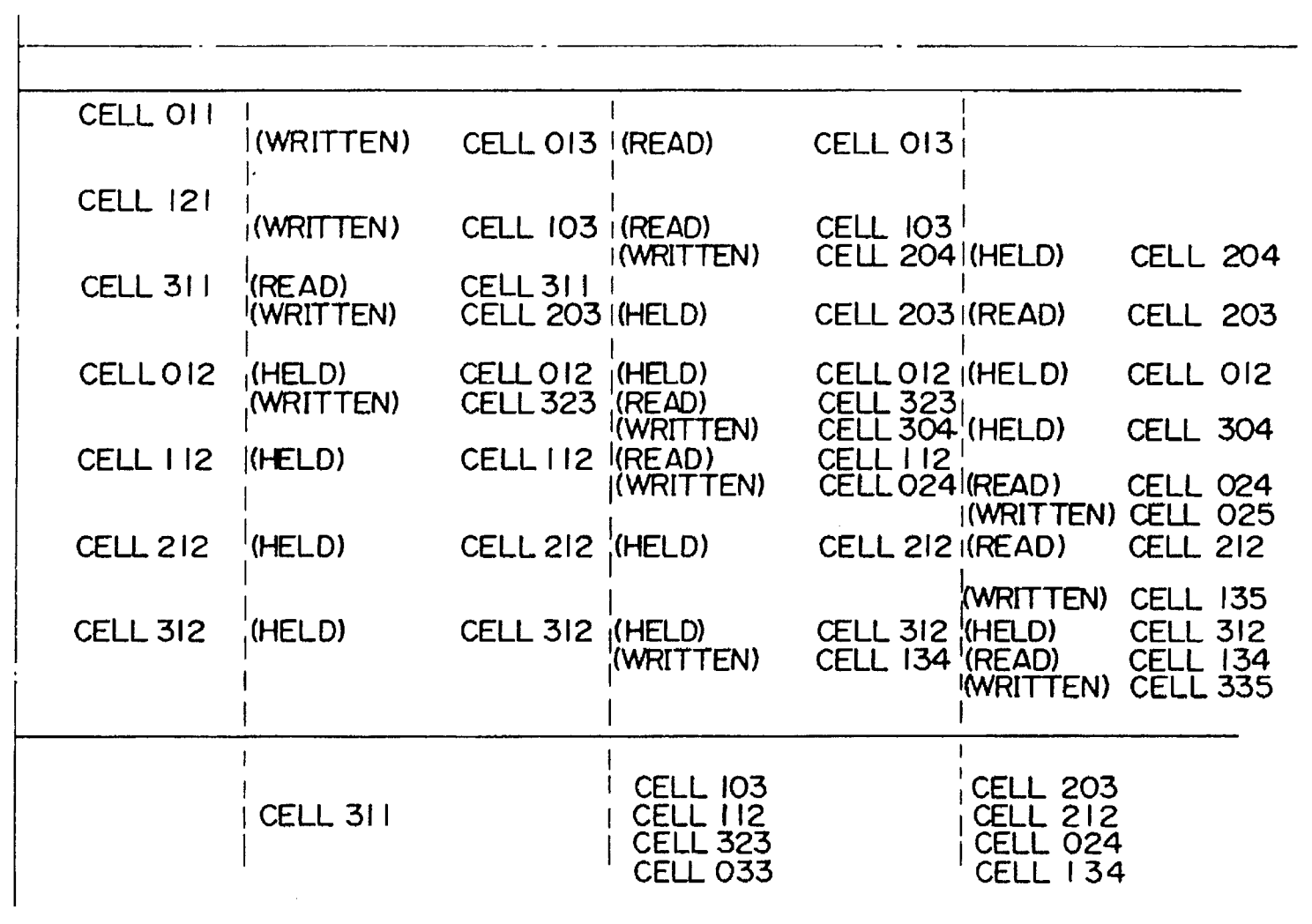

FIG. 6(a) shows time slot numbers, FIG. 6(b) shows examples of the cells input to the input lines $I_0$–$I_3$, FIG. 6(c) shows the internal state of the address table 21, FIGS. 6(d) and (e) show the internal states of the input line connection instructing circuit 20 and the output line connection instruction circuit 22, respectively, FIG. 6(f) shows the state of the buffer memories $11_1$–$11_7$ storing cells, and FIG. 6(g) shows the cells output through the output lines $0_1$–$0_3$. It is assumed that all the circuits are synchronized with each other, and only one cell can be input and output per one time slot.

When the cells are input to the input lines, the header processing circuits $10b_1$–$10b_4$ provided in correspondence to the input lines $I_0$–$I_3$ detect the output line numbers from the header portions of the input cells, and hold the cells for a period of one time slot. In reference to the header processing circuit $10b_1$–$10b_4$, the address table 21 in the buffer control circuit $15b$ determines in which buffer memory the cells input through the input lines are to be written. When the determined result is instructed to the input line connection instructing circuit 20, the input line spatial switch 13 connects the input lines at which the cells have arrived to the buffer memories which have been selected for storing the cells. Because only one cell can be written in and read out of one buffer memory within the same one time slot, the buffer memories $11_1$–$11_7$ must be so selected that the writing and reading of a plurality of cells do not occur in the same time slot.

The address table 21 includes a table rows of which represent destination output lines and columns of which represent reading time slots. Each of the boxes in the table contains the buffer memory number and the address in the buffer memory in which the cell to be read out in that time slot is written. Null signals are put in those boxes corresponding to the output lines through which no cells are to be output in any time slots. Upon arrival of the cells, the input line spatial switch 18 can be considered to connect the cells to the buffer memories $11_1$–$11_7$ in various ways. It is, however, undesirable for two or more cells to exist in the same one buffer memory in the case where the cells are stored and then read out of the buffer memories. To prevent this situation, the cells are preferably distributed to a number of buffer memories. To do this, employing the same number of buffer memories as that of the input lines is not sufficient. Also, when the cells are written, different buffer memories must be selected. Therefore, the number p of the buffer memories should be at least (number n of input lines)+(number m of output lines)−1. (In this second embodiment, the number p of the buffer memories is 7.)

In FIG. 6, the matrix-like table in the address table 21 is partitioned for each of the reading time slots. Because the capacity is finite, the table is cyclically reused in various time slots. To this end, a READ pointer rp is employed to point a READ position in the next time slot, and is cyclically updated. The table is arranged to prepare queues for the arriving cells in the order of arrival for each of the destination output lines. FIG. 6 shows an example of WRITE pointers $wp_0$–$wp_3$ employed for the respective destination output lines to point the writing positions next to the tail ends of the respective queues.

In order to determine the buffer memories in which the cells are to be written, when the cells arrive at the input lines, the buffer memories $11_1$–$11_7$ are checked sequentially from the input lines $I_1$–$I_3$ to confirm that the writing of a plurality of cells in the same buffer memory will not be effected in the same time slot and that the reading of a plurality of cells out of the same buffer memory will not be effected in the same time slot, and then buffer memories in which the cells to be written are determined. In this case, those buffer memories which are not filled with cells are selected in a cyclic manner.

In FIG. 6, it is assumed that no cell arrives before a time slot 1, and that three cells arrive through the input lines $I_0$, $I_1$ and $I_3$ in the time slot 1. Each cell is identified using the input line number, the output line number and the time slot in which the cell arrived. For instance, a cell 312 indicates that this cell arrives through the input line $I_s$ in the time slot 2 and is destined for the output line $0_1$. The READ pointer rp is positioned at the column No. 2 in the table in the time slot 1, and, it is assumed that, though not shown in FIG. 6, the WRITE pointers $wp_0$–$wp_3$ are all positioned at the column No. 3 in the table at the beginning of the time slot 1. A cell 011 arriving through the input line $I_0$ is stored in, for example, the buffer #0 because no other cell exists in the table at this time slot. This buffer memory $11_1$ is associated with the storage control circuit $12_1$ for managing the WRITE addresses. The WRITE address of the cell 011 is assumed to be 0. As shown in FIG. 6(c), in each box the upper side represents a buffer memory number and the lower side represents an address in the buffer memory. A cell 121 arriving through the input line $I_1$ is destined for the output line $0_2$ and, therefore, a buffer memory other than the buffer #0, for example, the buffer #1, used for storing the cell 011 is selected as a candidate. In reading the cell 121, it is required to check the column No. 3 in the table. Because only the buffer #0 is used in addition to the buffer #1, the buffer #1 meets the requirements Accordingly, the cell 121 is stored at an address 0 in the buffer #1. A cell 311 arriving through input line $I_3$ is destined for the output line $0_1$ and, therefore, stored at an address 0 in a buffer other than the buffers #0 and #1 used for storing the cells 011 and 121, that is, in the buffer #2, for example. When the writing and reading of the cells in the next time slot are determined, as explained above, the address table 21 sends constructions to the input line connection instructing circuit 20 and the output line connection instruction circuit 22 to cause the input line spatial switch 13 and the output line spatial switch 14 to perform necessary exchanging operations. Thus, the input line spatial switch 13 connects the input line $I_0$ to the buffer #0, the input line $I_1$ to the buffer #1 and the input line $I_3$ to the buffer #2, respectively and the cells are written in these buffers in the time slot 2. The column No. 2 of the table pointed by the READ pointer rp is fully occupied by null signals and, therefore, the output line connection instructing circuit 22 is instructed to cause the output line spatial switch 14 to perform no exchanging operation.

In the time slot 2, cells arrive through all the input lines $I_0$–$I_3$. Similar to the operation in the time slot 1, some of the buffer memories $11_1$–$11_7$ are selected so that a plurality of cells will not be written in or read out of the same buffer memory in the same time slot. In the time slot 2, the READ pointer rp is updated by one as compared with the time slot 1 and positioned in the column No. 3 of the table. The cell information in the column No. 3 of the table is sent to the output line connection instructing circuit 22. The output line spatial switch 14 then connects the buffer #0 to the output line $0_1$ and the buffer #1 to the output line $0_2$ in a time slot 3, respectively, and the reading of the cells is effected in the time slot 3.

As can be understood from the above description, when a cell arrives through the input lines, the buffer memories $11_1$–$11_7$ are checked in turn to confirm that a plurality of cells will not be written in the same buffer memory in the same single time slot, and a plurality of cells will not be read out of the same buffer memory in the same single time slot. Then, a buffer memory in which the cell is to be written is determined as a candidate. At time, those buffer memories which are not filled with the cells are selected as candidates in a cyclic manner. In a time slot 4, a cell 134 being destined for an output line $0_3$, the buffer #5 was first selected as a candidate. However, because the cell in the buffer #5 is read out in the same time slot, the buffer #6 is determined as a candidate. Likewise, the buffer #3 is finally selected for a cell 304. These two examples are indicated by o in FIG. 6.

As described above, in the ATM cell exchanging apparatus according to the second embodiment, one time slot is set as the unit of an operation cycle, and cells are written in buffer memories selected so as to avoid overlapping of the cells within each time slot. Cells are written in buffer memories, and are managed, in addresses in the buffer memories, for each destination and for each reading time slot in such a manner as to avoid overlapping of destinations within the same time slot. Those cells are then output to predetermined output lines. Consequently, as compared with the case of merely allocating the buffer memories $11_1$–$11_7$ in a cyclic manner, it is possible to avoid any collision between cells, and hence discarding of cells due to collision and delayed reading of the cells during the writing and reading operations can be avoided.

The third embodiment of the present invention will be described below with reference to FIGS. 7–9.

Figure 7B:
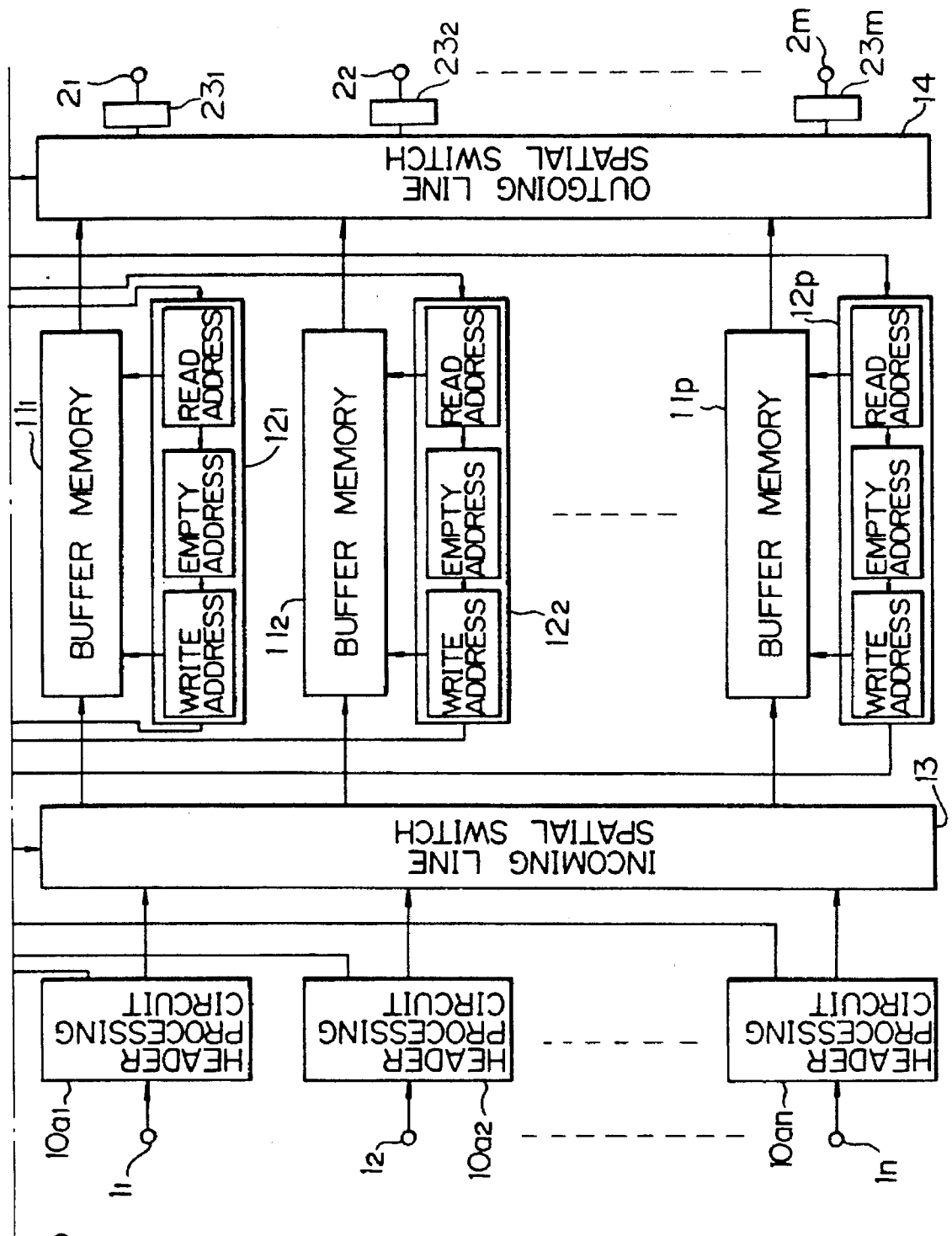

FIG. 7 is a block diagram showing the construction of an ATM cell exchanging apparatus according to the third embodiment of the present invention. In FIG. 7, the same or corresponding elements are denoted by the same reference numerals as those in the ATM cell exchanging apparatus according to the first embodiment and are not explained here.

Referring to FIG. 7, output line speed adjusting buffers $23_1$–$23_m$ are provided to correspond to the output lines $2_1$–$2_m$, respectively, to be connected to predetermined buffer memories through the output line spatial switch 14. The speed adjusting buffers store the cells read out of the buffer memories at a speed r ($2 \leq r <$ number of output lines) times the output line speed, and then output the cells to the corresponding output lines in accordance with the output line speed.

A buffer control circuit 15c comprises a first buffer selection circuit 16, an address exchanging circuit 17, address queues $18_1$–$18_m$ and a second buffer selection circuit 19. The buffer control circuit 15c functions to (i) control a switching operation of the input line spatial switch 13 to select the buffer memories in which cells are to be written, (ii) manage the addresses of the written cells in the buffer memories for each of the destinations of the cells, (iii) cause the cells to be read out of the buffer memories in accordance with the managed addresses in a predetermined order at a speed r ($2 \leq r <$ number of output lines) times the output line speed, (iv) control the output line spatial switch 14 to cause the read-out cells to be output to the output lines specified by the header portions, (v) write the cells in the corresponding output line speed adjusting buffers, and (vi) read out the stored cells in accordance with the output line speed for outputting them to the corresponding output lines.

An operation of this ATM cell exchanging apparatus will be described below. FIG. 8 is a time chart showing a timing relation between signals at various points in the ATM cell exchanging apparatus. Similar to the first embodiment, the time chart illustrates a control flow in which the number n of the input lines $1_1$–$1_n$ and the number m of the outgoing lines $2_1$–$2_m$ are each four (4) and that the number p of the buffer memories $11_1$–$11_p$ is ten (10). FIGS. 8(a)–8(r) show the same states as those in FIGS. 4(a)–4(r), respectively. It is also assumed that cells handled here are input at random and have a fixed length, and that the phases of respective cells are adjusted prior to being input to the input lines $1_1$–$1_n$ in such a manner that the cells are supplied at the same phase through all the input lines.

The basic sequence of exchanging ATM cells proceeds in a manner similar to the first embodiment. It is noted that an I2 cell and an H6 cell are both stored in the buffer memory $11_3$ in a time slot 8 as illustrated. Although the I2 and H6 cells have destinations different from each other; that is, the I2 cell is destined for the output line $2_2$ and the H6 cell is destined for the output line $2_3$, because these cells are stored in the same buffer memory $11_3$, they cannot be taken out simultaneously at a speed equal to the output line speed in the output lines $2_1$–$2_4$.

FIG. 9 is a time chart partially showing the time slots 6–13 in FIG. 8 on a larger scale. FIG. 9 shows the case where the cells are read out of the buffer memories $11_1$–$11_{10}$ at a speed 3 times the output line speed in the output lines $2_1$–$2_m$. In FIGS. 9(e)–9(n) show examples of the cells stored in the buffer memories $11_1$–$11_{10}$, FIGS. 9(s)–9(v) show states of the cells written in the output line speed adjusting buffers $23_1$–$23_4$, and FIGS. 9(o)–9(r) show examples of the cells output to the output lines $2_1$–$2_4$, respectively.

In FIG. 9, the I2 cell and the H6 cell in the buffer memory $11_3$ are destined for different destinations in the same time slot 8. However, both the I2 and H6 cells would be simultaneously output to the corresponding output lines $2_2$ and $2_3$ by reading these cells out of the buffer memory $11_3$ at a speed 3 times the output line speed. Generally, by reading cells out of the buffer memory $11_1$–$11_{10}$ at a speed 3 times the output line speed, it becomes possible to write in each of the buffer memories $11_1$–$11_{10}$ up to 3 cells which are to be read out in the same time slot.

Similar events occur in other time slots 9, 10 and 15 as well, but the cells are not in any case required to delay the reading of a cell in order to avoid any collision.

The speed of reading cells out of the buffer memories $11_1$–$11_{10}$ is not limited to 3 times the output line speed, and may be generally set at r ($2 \leq r <$ number of output lines) times the output line speed. While it is assumed that the buffer memories $11_1$–$11_{10}$ are of the type of a dual-port memory, this embodiment is also made feasible by using single-port memories which can operate at a speed double or more the output line speed.

Even in the case that the number of cells read out of the same buffer memory in one time slot exceeds r, a collision between the cells can be avoided by setting the output lines $2_1$–$2_m$ in a fixed preferential order or variable preferential order changeable at random and by taking out r cells while delaying the reading of the remaining cells.

In the ATM cell exchanging apparatus according to the third embodiment, as described above, since the cells stored in the buffer memories are read out at a speed r ($2 \leq r <$ number of output lines) times the output line speed, opportunities of reading the cells out of the same buffer memory increase, which enables a reduction in the rate of cells discarded by collision during the reading operation.

Figure 10B:
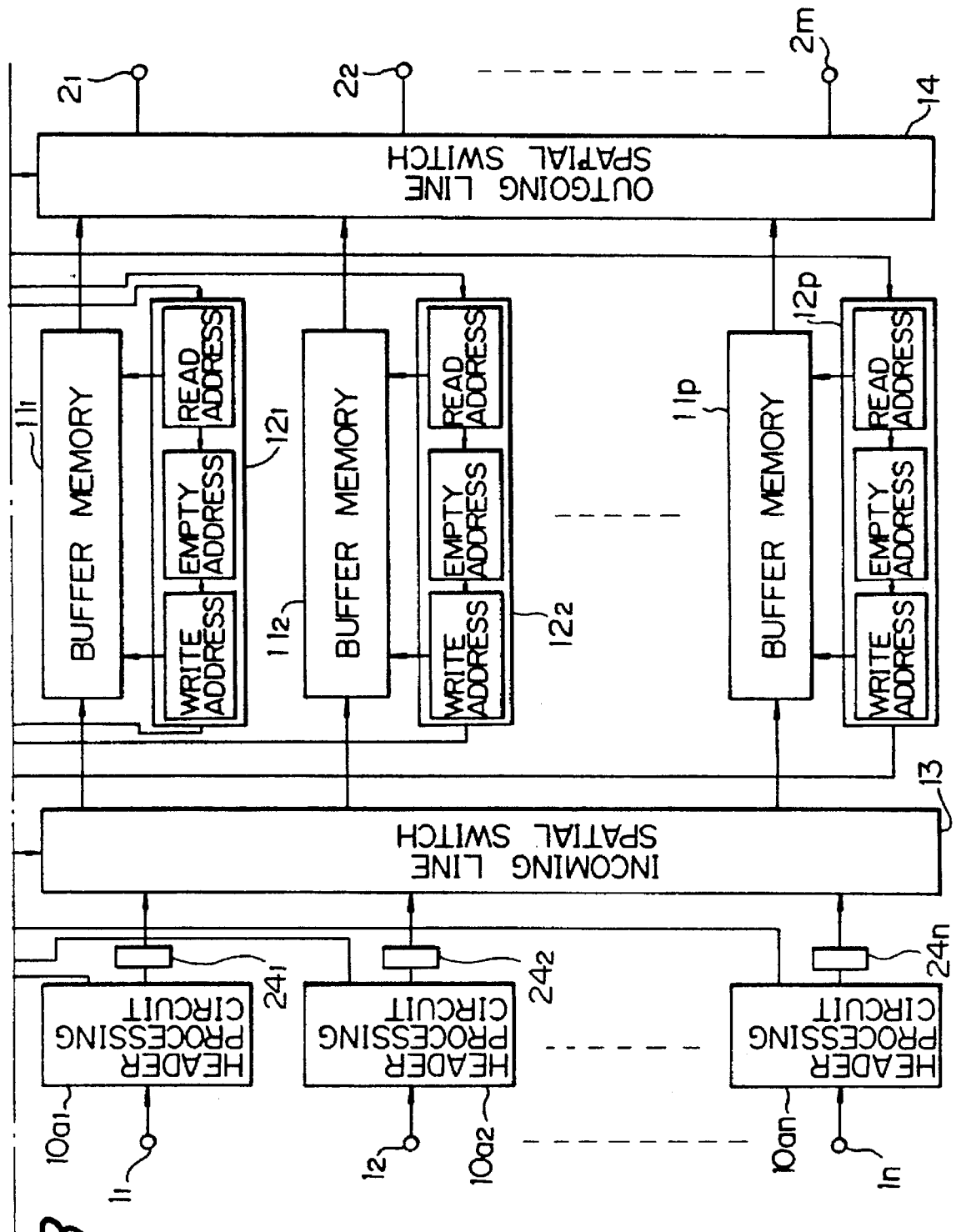

FIG. 10 is a block diagram showing the construction of an ATM cell exchanging apparatus according to a fourth embodiment of the present invention. In FIG. 10, the same or corresponding elements are denoted by the same reference numerals as those in the ATM cell exchanging apparatus according to the third embodiment and are therefore not explained here.

Referring to FIG. 10, input line speed adjusting buffers $24_1$–$24_n$ are provided to correspond to the input lines $1_1$–$1_n$, respectively, for storing the cells output from the corresponding header processing circuits $10a_1$–$10a_n$ and for then reading the stored cells at a speed w ($2 \leq w <$ number of input lines) times the input line speed to deliver the cells to predetermined buffer memories $11_1$–$11_p$ through the input line spatial switch 13.

A buffer control circuit 15d comprises a first buffer selection circuit 16, an address exchanging circuit 17, address queues $18_1$–$18_m$ and a second buffer selection circuit 19. The buffer control circuit 15d functions to (i) cause the cells stored in the input line speed adjusting buffers to be read out at a speed w ($2 \leq w <$ number of input lines) times the input line speed, (ii) control the input line spatial switch 13 to select the buffer memories in which the cells are to be written, (iii) cause the read-out cells to be written the selected buffer memories at a speed w times the input line speed, (iv) manage the addresses of the cells written in the buffer memories for each of the destinations of the cells, and (v) control the output line spatial switch 14 in accordance with those addresses under management for outputting the cells in a predetermined order to the output lines specified by the header portions.

Figures 11, 11A:
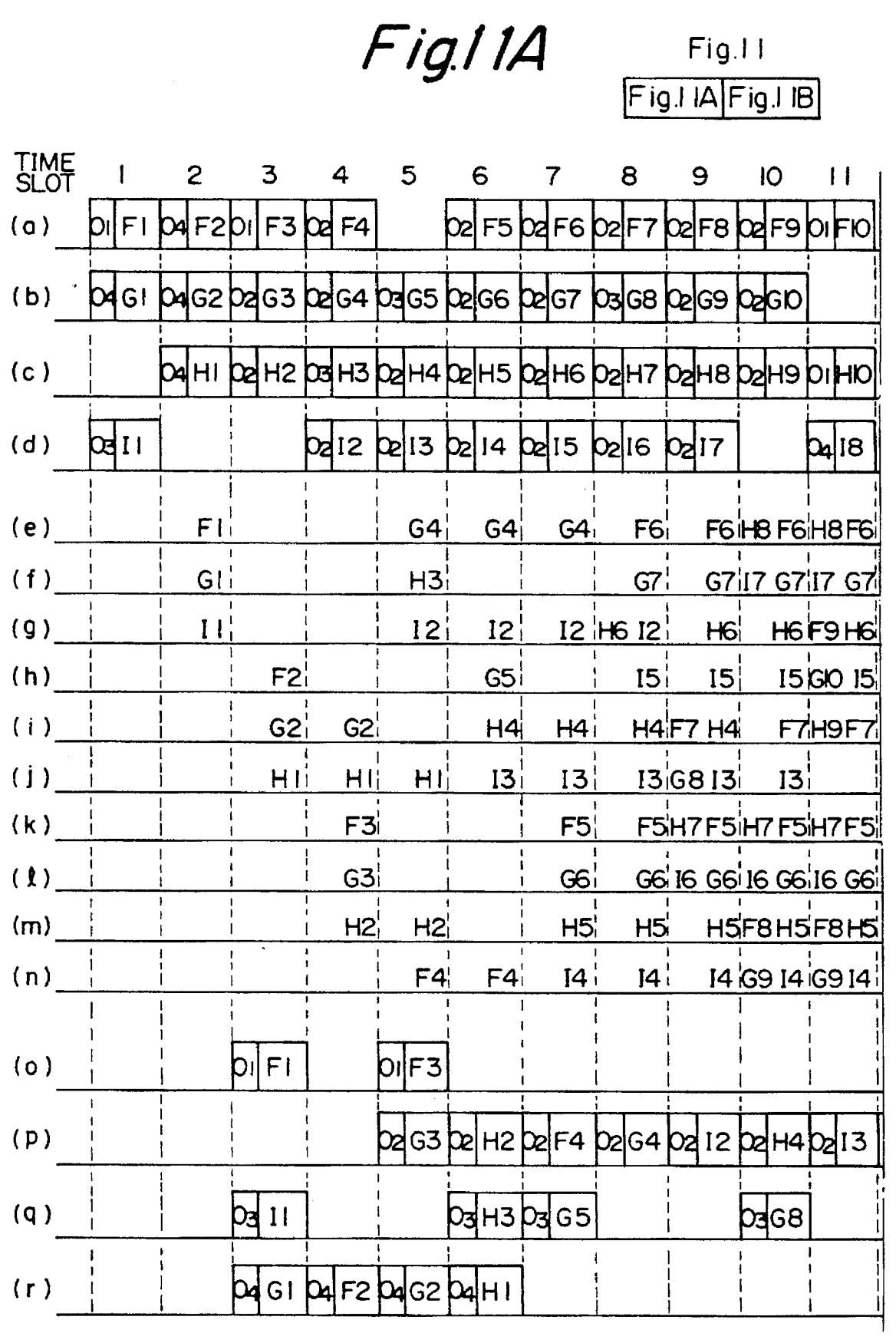

An operation of this ATM cell exchanging apparatus will be described below. FIG. 11 is a time chart showing a timing relation between signals at various points in the cell exchanging apparatus of FIG. 10. Similar to the first embodiment shown in FIG. 4, the time chart illustrates control flow in which the number n of the input lines $1_1$–$1_n$ and the number m of the output lines $2_1$–$2_m$ are each four (4) and that the number p of the buffer memories $11_1$–$11_p$ is ten (10). FIGS. 11(a)–11(r) show the same states as those in FIGS. 4(a)–4(r), respectively. It is assumed that the buffer memories $11_1$–$11_p$ each have capacities equal to two cells, that cells handled in this embodiment are input at random and have a fixed length, and that the phases of respective cells input are adjusted prior to being input to the input lines $1_1$–$1_n$ in such a manner that the input cells are supplied at the same phase through all the input lines.

When cells are input through the input lines, the header processing circuits associated with the input lines detect output line numbers from the cell headers and cause the cells to write in the corresponding incoming line speed adjusting buffers. In reference to the header processing circuits, the first buffer selection circuit in the buffer control circuit 15d instructs the input line spatial switch 13 to interconnect the input line speed adjusting buffers in which the cells have been written and the buffer memories selected for storing the cells, respectively.

A speed of reading cells out of the input line speed adjusting buffers $24_1$–$24_4$, i.e., a speed of writing cells in the buffer memories $11_1$–$11_{10}$ is assumed to be 2 times the input line speed in the input lines $1_1$–$1_4$, thereby allowing two cells to be written in the same buffer memory in one time slot.

Assuming that the buffer memories $11_1, 11_2, 11_3, \ldots, 11_{10}$ are selected in this order to cause the arriving cells to be written in the buffer memories in the order of arrival, if some of the buffer memories in which cells are to be written in any time slot are already filled with the cells, the filled buffer memories are skipped over, and a cell is written in the next buffer memory. In order to make sure that the cells are written in different buffer memories, the cells are preferably distributed by being written in the buffer memories. In this embodiment, because the speed of writing cells in the buffer memories $11_1$–$11_{10}$ is set at 2 times the input line speed, it is possible to write a plurality (two) of cells in each of the buffer memories $11_1$–$11_{10}$ in one time slot if any cells are unavoidably discarded, thereby reducing the number of cells discarded.

In FIG. 11, because the buffer memory $11_6$ is empty to be able to receive two cells and the buffer memory is empty to be able to receive one cell in a time slot 11, three cells, i.e., F10, H10 and I8 cells input in the time slot 11 cannot be written in different buffer memories. By utilizing the fact that the speed of writing cells in the buffer memories $11_1$–$11_{10}$ is twice the input line speed, therefore, the both F10 and H10 cells are written in the buffer memory $11_6$ in order to prevent the cells from being discarded. The state after those three cells have been written in the buffer memories is indicated in FIGS. 11(i) and 11(j) by putting the symbols F10, H10 and I8 in circles.

The basic sequence of exchanging ATM cells proceeds in a manner similar to the first embodiment.

Although the speed of writing cells in the buffer memories $11_1$–$11_{10}$ is set at 2 times the input line speed in the above case, that speed may generally be set to w (2≦w<number of input lines) times the input line speed. While it is assumed that the buffer memories $11_1$–$11_{10}$ are each constituted by dual-port memories, this embodiment is also made feasible by using single-port memories which can operate at a double speed or more.

In the ATM cell exchanging apparatus according to the fourth embodiment, as described above, destinations of cells are detected and the cells are then written, at a speed w (2≦w<number of input lines) times the input line speed, in the buffer memories selected by the input line spatial switch. It is therefore possible to write no more than w cells in the same buffer memory and hence to reduce the number of cells discarded due to collision during the writing operation.

The present invention has been described in detail with particular reference to several preferred embodiments thereof, but variations and modifications of the invention can be effected without departing from the spirit and scope of the invention. For example:

(i) Although the first to fourth embodiments showy a single unit ATM cell exchanging apparatus, a plurality of cell exchanging apparatuses may be linked to form a multi-stage configuration;

(ii) Instead of directly designating, as destination (address) information in the header portions, the output line numbers corresponding to the output lines of the cell exchanging apparatus, some conversion process may be allowed; for example, encoded numbers may be provided as destination information in the header portions;

(iii) In FIGS. 4, 6, 8 and 11, for simplicity of explanation, when the cells arrive through the input lines, the cell exchanging apparatus selects buffer memories as candidates from one end thereof to the other (in the order of the buffers #0, #1, . . . in FIG. 6) for writing the cells in the selected memories. But, it may be possible when there is a difference in the arrival time of the cells to further reduce the number of discarded cells by selecting the buffer memories which hold the least number of cells, as memory candidates, to write the cells in the selected memories, so that the individual buffer memories operate as if as a whole they substantially have capacity equivalent to that of one large-sized buffer memory shared by all the input lines;

(iv) Although one cell is output to one output line in the above first to fourth embodiments, it may be possible that the cell selection circuits in the output stage can be arranged to cause one single cell to be output to a plurality of output lines by means of a proper determination of addresses. This permits the addition of a broadcasting function to the ATM cell exchanging apparatus;

(v) It may be possible that, as an alternative structure of the ATM cell, a data portion and a header portion of a cell are separated and transmitted through separate circuits having different speeds, the data and the header portions being respectively allocated to a plurality of signal lines arranged in parallel;

(vi) Although a link speed of the input lines is constant in any of the above first to fourth embodiments, traffic convergence can be made possible by setting the reading speed at the buffer memories higher than the link speed of the input lines. Conversely, it is also possible to make the link speed of the input lines higher than the output line speed. When a plurality of ATM cell exchanging apparatuses are linked with each other as mentioned above, the number of discarded cells between the adjacent stages of the cell exchanging apparatuses can be further lowered by setting a transfer speed between the stages higher than the input line speed;

(vii) In any of the above first to fourth embodiments, the address queues are provided in correspondence to the output lines of the ATM cell exchanging apparatus. But, it is also possible to allocate to each output line a plurality of address queues having different priorities and read the cells out of the buffer memories in the order of priority based on symbols placed in addition to the output line numbers in the cell headers for indicating the priority; and (viii) If it is required to restrict the operation speed, a serial/parallel converter and a parallel/serial converter may be added before and after the cell exchanging apparatus, respectively, thereby carrying out a parallel signal processing.

What is claimed is:

1. An asynchronous transfer mode cell switching apparatus for exchanging asynchronous transfer mode cells between a plurality of input lines for receiving cells and a plurality of output lines, each cell including a data portion and a header portion including destination information indicating an output line, the asynchronous transfer mode cell switching apparatus comprising:

a plurality of buffer memories in which received cells are stored and from which the received cells are read selectively;

an input spatial switch for selectively connecting one of said input lines to one of said buffer memories;

an output spatial switch for selectively connecting one of said buffer memories to one of said output lines; and a buffer control circuit for controlling said input spatial switch to select a buffer memory in which a received cell is to be stored and for controlling said output spatial switch in accordance with the destination information included in the header portion of received cells.

2. The asynchronous transfer mode cell switching apparatus of claim 1, further comprising:

a header processing circuit, provided for each of said input lines and connected between the input line and the input spatial switch, for holding for a period of one time slot the received cells, and for detecting the destination information from the header portions of received cells and for providing the destination information to the buffer control circuit; and wherein the number of the plurality of buffer memories is equal to or greater than the sum of the number of input lines and the number of output lines, less one, and wherein received cells are written into said plurality of buffer memories at locations specified by addresses and are read from the locations specified by using addresses in a manner which is independent of the order in which the received cells were written; and wherein the buffer control circuit controls said input spatial switch to cause cells held in said header processing circuits to be written, in one time slot, into the selected buffer memory so as to avoid the overlapping of cells, and controls said output spatial switch to cause any cells which have been written into one of said buffer memories at addresses managed by said buffer memories, for each time slot, to be output in a predetermined order to the output lines.

3. The asynchronous transfer mode cell switching apparatus of claim 1, further comprising:

a header processing circuit, provided for each of said input lines, for detecting the destination information from the header portions of the received cells and for providing the destination information to the buffer control circuit; and an input line speed adjusting buffer, provided for each of said input lines and connected between the input line and the input spatial switch, for temporarily storing the received cells to adjust an input line speed; and wherein received cells are written into the plurality of buffer memories in locations specified by addresses and the received cells are read from the plurality of buffer memories in a manner which is independent of the order in which the received cells were written; and wherein the buffer control circuit causes the received cells to be read from said input line speed adjusting buffer to control the selection of said buffer memory into which the received cells are to be written by said input spatial switch, the cells being written in said buffer memory at a speed determined by multiplying the input line speed by a number equal to or greater than 2 but smaller than the number of said input lines, and wherein the buffer control circuit includes means for managing the addresses of the cells written in said buffer memory for each of the destinations of the received cells to control said output spatial switch in accordance with the managed addresses so that the received cells are output in a predetermined order to the output lines.

4. The asynchronous transfer mode cell switching apparatus of claim 1, wherein received cells are written into the plurality of buffer memories in locations specified by addresses and the received cells are read from the plurality of buffer memories by using addresses, in a manner which is independent of the order in which the received cells are written; and wherein the buffer control circuit includes means for managing the addresses of the received cells written in the buffer memory for each of the destinations of the received cells, and wherein the buffer control circuit controls said output spatial switch in accordance with the managed addresses so that the received cells are output in a predetermined order to the output lines.

5. The asynchronous transfer mode cell switching apparatus of claim 1, further comprising:

means, provided for each of said input lines and connected between the input lines and the input spatial switch, for holding received cells for a period of one time slot; and wherein the number of the plurality of buffer memories is equal to or greater than the sum of the number of input lines and the number of output lines, less one, and wherein the received cells are written into said buffer memories at locations specified by addresses and are read from the locations specified by using addresses in a manner which is independent of the order in which the received cells were written; and wherein the buffer control circuit controls said input spatial switch to cause cells, held in said means for holding, to be written in one time slot, into the selected buffer memory so as to avoid the overlapping of cells, and controls said output spatial switch to cause any cells which have been written into one of said buffer memories at addresses managed by said buffer memories, for each time slot, to be output in a predetermined order to the output lines.

6. The asynchronous transfer mode cell switching apparatus of claim 1, wherein received cells are written into the plurality of buffer memories in locations specified by addresses and the received cells are read from the plurality of buffer memories by using the specified addresses in a manner which is independent of the order in which the received cells are written; and further comprising an output line speed adjusting buffer, provided for each of said output lines and connected between the output spatial switch and the output lines, for storing the received cells and for adjusting an output line speed;

wherein the buffer control circuit includes means for managing the addresses of the written cells in said buffer memory for each of the destinations of the cells so as to cause the cells to be read from said buffer memory in a predetermined order in accordance with the managed addresses at a speed determined by multiplying the output line speed by a number equal to or greater than 2 but smaller than the number of said output lines, wherein the received cells are written into said output line speed adjusting buffer and read from said output line speed adjusting buffer in accordance with the output line speed.

7. The asynchronous transfer mode cell switching apparatus of claim 1, further comprising:

an input line speed adjusting buffer, provided for each of said input lines and connected between the input line and the input spatial switch, for temporarily storing the received cells to adjust an input line speed; and wherein received cells are written into the plurality of buffer memories in locations specified by addresses and the received cells are read from the plurality of buffer memories in a manner which is independent of the order in which the received cells were written; and wherein the buffer control circuit causes the received cells to be read from said input line speed adjusting buffer to control the selection of said buffer memory into which the received cells are to be written by said input spatial switch, the cells being written in said buffer memory at a speed determined by multiplying the input line speed by a number equal to or greater than 2 but smaller than the number of said input lines, and wherein the buffer control circuit includes means for managing the addresses of the cells written in said buffer memory for each of the destinations of the received cells to control said output spatial switch in accordance with the managed addresses so that the received cells are output in a predetermined order to the output lines.

8. The asynchronous transfer mode cell switching apparatus of claim 1, further comprising:

a header processing circuit, provided for each of said input lines and connected between the input line and the input spatial switch, for detecting the destination information from the header portion of received cells and for providing the destination information to the buffer control circuit; and wherein received cells are written into the plurality of buffer memories in locations specified by addresses and the received cells are read from the plurality of buffer memories by using addresses, in a manner which is independent of the order in which the received cells are written; and wherein the buffer control circuit includes means for managing the addresses of received cells written in the buffer memory for each of the destinations of the received cells, and wherein the buffer control circuit controls said output spatial switch in accordance with the managed addresses so that the received cells are transmitted in a predetermined order to the output lines, and wherein the buffer control circuit includes means for counting amounts of cells stored in respective buffer memories for controlling said input spatial switch so that a first number of significant cells are written in the first number of buffer memories having the least amounts of storage, when the first number of said input lines receive significant cells.

9. The asynchronous transfer mode cell switching apparatus of claim 1, wherein received cells are written into the plurality of buffer memories in locations specified by addresses and the received cells are read from the plurality of buffer memories by using addresses, in a manner which is independent of the order in which the received cells are written;

wherein the buffer control circuit includes means for managing the addresses of the received cells written in the buffer memory for each of the destinations of the received cells, and wherein the buffer control circuit controls said output spatial switch in accordance with the managed addresses so that the received cells are transmitted in a predetermined order to the output lines and wherein said buffer control circuit includes means for counting mounts of cells stored in respective buffer memories and for controlling said input spatial switch so that a first number of significant cells are written in the first number of buffer memories having the least amounts of storage, when the first number of said input lines receive significant cells.

10. The asynchronous transfer mode cell switching apparatus of claim 1, further comprising:

a header processing circuit, provided for each of said input lines and connected between the input line and the input spatial switch, for detecting the destination information from the header portions of received cells and for providing the destination information to the buffer control circuit.

11. The asynchronous transfer mode cell switching apparatus of claim 10, wherein received cells are written into the plurality of buffer memories in the locations specified by addresses and the received cells are read from the plurality of buffer memories by using addresses, in a manner which is independent of the order in which the received cells are written; and wherein the buffer control circuit includes means for managing the addresses of the received cells written in the buffer memory for each of the destinations of the received cells, and wherein the buffer control circuit controls said output spatial switch in accordance with the managed addresses so that the received cells are output in a predetermined order to the output lines.

12. The asynchronous transfer mode cell switching apparatus of claim 10, wherein received cells are written into the plurality of buffer memories in locations specified by addresses and the received cells are read from the plurality of buffer memories by using the specified addresses in a manner which is independent of the order in which the received cells are written; and further comprising an output line speed adjusting buffer, provided for each of said output lines and connected between the output line and the output spatial switch, for storing the received cells and for adjusting an output line speed; and wherein the buffer control circuit includes means for managing the addresses of the written cells in said buffer memory for each of the destinations of the cells so as to cause the cells to be read from said buffer memory in a predetermined order in accordance with the managed addresses at a speed determined by multiplying the output line speed by a number equal to or greater than 2 but smaller than the number of said output lines, wherein the received cells are written into said output line speed adjusting buffer and read from said output line speed adjusting buffer in accordance with the output line speed.

13. An asynchronous transfer mode (ATM) cell switching method, comprising the steps of:

providing a plurality of input lines for receiving ATM cells, each ATM cell including a data portion and a header portion including destination information;

providing a plurality of output lines to which the received ATM cells are output in accordance with the destination information included in the header portion;

providing a header processing circuit for each of said input lines, for detecting the destination information from the header portion of received ATM cells;

writing received ATM cells into locations of a plurality of buffer memories by addresses and reading received ATM cells from said buffer memories by using addresses, in a manner which is independent of the order in which received ATM cells are written;

selectively connecting one of said header processing circuits to one of said buffer memories using an input spatial switch;

selectively connecting one of said buffer memories to one of said output lines using an output spatial switch;

controlling said input spatial switch to select one of said buffer memories in which received ATM cells are to be written and for managing the addresses of received ATM cells written in the buffer memory for each of the destinations of the received ATM cells, and controlling said output spatial switch in accordance with the managed addresses so that the received ATM cells are transmitted in a predetermined order to the output lines which are specified by the destination information from header portions of the received ATM cells, said step of controlling being performed by means of counting amounts of ATM cells stored in respective said buffer memories for controlling said input spatial switch so that a first number of significant ATM cells are written in the first number of buffer memories having the least amounts of storage, when the first number of said input lines receive significant ATM cells.

14. An asynchronous transfer mode (ATM) cell switching method comprising the steps of:

providing a plurality of input lines for receiving ATM cells each including a data portion and a header portion including destination information;

providing a plurality of output lines for transmitting said ATM cells to the destinations included in the header portions;

storing ATM cells from said input line into a plurality of buffer memories and reading the written ATM cells from said buffer memories;

selecting one of said input lines which receives the ATM cells to be stored in one of said buffer memories, using an input spatial switch;

selecting one of said output lines to which the ATM cells stored in the buffer memory are read, using an output spatial switch; and controlling said input spatial switch on the basis of the state of the buffer memory in which the selected ATM cells are stored, and controlling said output spatial switch so that the selected ATM cells are transmitted to the destinations included in the header portions on the basis of the destination information.

15. An asynchronous transfer mode (ATM) cell switching method comprising the steps of:

providing a plurality of input lines for receiving ATM cells each including a data portion and a header portion including destination information;

providing a plurality of output lines for transmitting said ATM cells to the destinations specified by the destination information in the header portions;

storing ATM cells from said input line into a plurality of buffer memories and reading the stored ATM cells from said buffer memories to said output lines;

selecting one of said input lines which receives the ATM cells to be stored in one of said buffer memories, using an input spatial switch;

selecting one of said output lines to which the ATM cells stored in the buffer memory are read, using an output spatial switch; and controlling said input spatial switch on the basis of the destination information of the ATM cells, and for controlling said output spatial switch so that the ATM cells are transmitted to the destinations specified by the header portions.

16. An asynchronous transfer mode (ATM) cell switching apparatus comprising:

a plurality of input lines for receiving ATM cells each including a data portion and a header portion including destination information;

a plurality of output lines for transmitting said ATM cells to the destinations included in the header portions;

a plurality of buffer memories to which ATM cells from said input line are stored and from which the selected ATM cells are read to said output lines;

an input spatial switch for selecting one of said input lines which receives the ATM cells to be stored in one of said buffer memories;

an output spatial switch for selecting one of said output lines to which the ATM cells stored in the buffer memory are read; and a buffer memory control circuit for controlling said input spatial switch on the basis of the state of the buffer memory in which the ATM cells are stored, and for controlling said output spatial switch so that the ATM cells are transmitted to the destinations included in the header portions on the basis of the destination information.

17. An asynchronous transfer mode (ATM) cell switching apparatus comprising:

a plurality of input lines for receiving ATM cells each including a data portion and a header portion including destination information;

a plurality of output lines for transmitting said ATM cells to the destinations included in the header portions;

a plurality of buffer memories to which ATM cells from said input line are stored and from which the stored ATM cells are read to said output lines;

an input spatial switch for selecting one of said input lines which receives the ATM cells to be stored in one of said buffer memories;

an output spatial switch for selecting one of said output lines to which the ATM cells stored in the buffer memory are read; and a buffer memory control circuit for controlling said input spatial switch on the basis of the destination information of the ATM cells, and for controlling said output spatial switch so that the ATM cells are transmitted to the destinations included in the header portions.

18. The ATM cell switching apparatus as claimed in claim 16 or 17, wherein said buffer memory control circuit controls said input spatial switch on the basis of amounts of the ATM cells stored in said buffer memory.

19. A packet switching system, comprising:

a plurality of inputs, each of which is adapted to receive a packet, wherein the packet contains data and destination information;

a plurality of outputs, each of which is adapted to provide the packet to a transmission line;

a plurality of memory elements;

an input spatial switch having a plurality of selectable connections, wherein each connection connects a selected one of said inputs to a selected one of said memory elements;

an output spatial switch having a plurality of selectable connections, wherein each connection connects a selected one of said outputs to a selected one of said memory elements;

a control circuit connected to the input switch and the output switch and adapted to control the input switch and the output switch so as to direct the packet to one of the outputs in accordance with the destination information of the packet.

20. The system of claim 19 wherein the packet switching network is an asynchronous transfer mode cell switching apparatus and the packet comprises an ATM cell.

21. The system of claim 19 wherein the input switch is a spatial switch.

22. The system of claim 19 wherein the output switch is a spatial switch.

23. The system of claim 19 wherein the packet has a header containing the destination information.

24. A packet switching system, comprising:

a plurality of inputs, each of which is adapted to receive a packet, wherein the packet contains data and destination information;

a plurality of outputs, each of which is adapted to provide the packet to a transmission line;

a plurality of memory elements;

an input spatial switch having a plurality of selectable connections, wherein each connection connects a selected one of said inputs to a selected one of said memory elements;

an output spatial switch having a plurality of selectable connections, wherein each connection connects a selected one of said outputs to a selected one of said memory elements;

a buffer control circuit connected to the input switch and the output switch and adapted to control the input switch according to a state of the memory elements in which the packet is stored and adapted to control the output switch so as to direct the packet to one of the outputs in accordance with the destination information of the packet.

25. The system of claim 24 wherein the control circuit includes means for counting an amount of packets stored in each of said memory elements and for controlling the input switch so that a first number of packets are written in the first number of memory elements having a least amount of storage when the first number of said input lines receives significant packets.

26. The system of claim 24, wherein the control circuit controls said input switch according to an amount of packets written in said memory elements.

27. A packet switching system, comprising;

plurality of inputs for receiving packets, wherein a packet contains data and destination information;

a plurality of outputs for providing packets to transmission lines;

a plurality of separate means for storing packets;

input spatial switch for connecting each of the inputs to a selected corresponding separate means for storing;

output spatial switch for connecting each of the outputs to a selected corresponding separate means for storing;

means for controlling the first and second means for connecting so as to direct packets from the inputs to the outputs in accordance with the destination information of the packets.

28. The system of claim 27 wherein the means for controlling controls the first means for connecting according to an amount of packets stored in the means for storing.

* * * * *